(12) United States Patent
Mattelaer

(10) Patent No.: US 12,462,680 B2
(45) Date of Patent: Nov. 4, 2025

(54) METHOD AND PROCESSING SYSTEM FOR PROCESSING PROBE DATA AND PROBE

(71) Applicant: TomTom Global Content B.V., Amsterdam (NL)

(72) Inventor: Jean-Claude Mattelaer, Gentbrugge (BE)

(73) Assignee: TomTom Global Content B.V., Amsterdam (NL)

( * ) Notice: Subject to any disclaimer, the term of this patent is extended or adjusted under 35 U.S.C. 154(b) by 191 days.

(21) Appl. No.: 18/234,284

(22) Filed: Aug. 15, 2023

(65) Prior Publication Data

US 2024/0071217 A1  Feb. 29, 2024

(30) Foreign Application Priority Data

Aug. 23, 2022 (EP) .................................... 22191824

(51) Int. Cl.
| | |
|---|---|
| *G08G 1/065* | (2006.01) |
| *B60W 60/00* | (2020.01) |
| *G08G 1/01* | (2006.01) |

(52) U.S. Cl.
CPC ........... *G08G 1/065* (2013.01); *B60W 60/001* (2020.02); *G08G 1/0129* (2013.01); *G08G 1/0145* (2013.01); *B60W 2554/406* (2020.02); *B60W 2556/40* (2020.02); *B60W 2556/65* (2020.02)

(58) Field of Classification Search
CPC .... G08G 1/065; G08G 1/0129; G08G 1/0145; G08G 1/0133; G08G 1/0141; G08G 1/096725; G08G 1/0112; G08G 1/0104; G08G 1/0108; G08G 1/0137; B60W 60/001; B60W 2554/406; B60W 2556/40; B60W 2556/65

See application file for complete search history.

(56) References Cited

U.S. PATENT DOCUMENTS

| | | | |
|---|---|---|---|
| 2013/0051661 A1* | 2/2013 | Robinson | G06V 20/13 382/199 |
| 2019/0051155 A1 | 2/2019 | Yamaguchi | |
| 2020/0242944 A1 | 7/2020 | Barberis et al. | |
| 2021/0063182 A1* | 3/2021 | Williams | G01C 21/3679 |
| 2021/0129868 A1* | 5/2021 | Nehmadi | G06V 20/597 |
| 2023/0316821 A1* | 10/2023 | Clewlow | G07C 5/02 705/7.22 |
| 2023/0419675 A1* | 12/2023 | Stenneth | G07C 5/008 |
| 2024/0037444 A1* | 2/2024 | Beaurepaire | G06N 20/00 |

FOREIGN PATENT DOCUMENTS

JP    2005222193 A    8/2005

OTHER PUBLICATIONS

Extended European Search Report for application 22191824.6 dated Feb. 9, 2023.

* cited by examiner

*Primary Examiner* — Sze-Hon Kong
(74) *Attorney, Agent, or Firm* — Whitmyer IP Group LLC

(57) ABSTRACT

A processing system processes probe data to determine a change in a number of vehicles parked in an area, the probe data comprising information on probe traces for a plurality of probes. The processing system identifies occurrence of an event based at least on the determined change in the number of vehicles parked in the area. The processing system causes the identified occurrence of the event to be used for performing one or several operations.

19 Claims, 11 Drawing Sheets

METHOD AND PROCESSING SYSTEM FOR PROCESSING PROBE DATA AND PROBE

TECHNICAL FIELD

Embodiments of the invention relate to techniques associated with devices operative to perform navigation functions such as determining routes and providing traffic warnings. Embodiments of the invention relate in particular to methods, systems, and devices operable to process probe data that indicate traces of probes, such as portable or in-dashboard navigation devices for vehicles. Embodiments of the invention also relate to probes and other devices or systems operable to use results of a prediction of future traffic buildup as provided by the processing method and system.

BACKGROUND

Navigation devices are widely used and very popular, owing, e.g., to their capability of providing assistance in navigation tasks and their capability of utilizing information on changed traffic conditions.

Navigation device functions such as dynamic route search and/or traffic warning generation can take into consideration changing traffic conditions. Changing traffic situations can be observed by aggregating information from navigation devices and, optionally, other information sources. This allows traffic conditions such as traffic jams or high traffic loads to be taken into consideration after such traffic conditions have come into existence.

It is generally desirable to accommodate changing traffic conditions in a predictive manner. This can be done for traffic patterns that have regularly recurrent characteristics. Regularly recurring traffic patterns, such as traffic peaks that are known to occur as a function of day of weak and/or time of day, can be considered to be known in advance and can be taken into consideration for route guidance or the provision of traffic information.

The prediction of increases in traffic that are not associated with regularly recurring patterns but that are repeated in an aperiodic and/or sporadic manner is a considerable challenge. Information on such increases in traffic would be useful for further improving navigation and/or traffic management and/or electronic map-based functions.

SUMMARY

It is an object of embodiments of the invention to provide methods, systems, and devices that allow events that give rise to future traffic increases to be identified. Alternatively or additionally, it is an object of embodiments of the invention to provide methods, systems, and device that allow events that give rise to future traffic increases to be identified without relying exclusively on information provided by publicly available event calendars that may be accessible via web crawling techniques.

According to embodiments, methods, systems, and devices as recited in the independent claims are provided. The dependent claims define preferred embodiments.

A method of processing probe data by a processing system is provided. The method comprises processing the probe data to determine a change in a number of vehicles parked in an area. The probe data may comprise information on probe traces for a plurality of probes. The method comprises identifying occurrence of an event based at least on the determined change in the number of vehicles parked in the area.

The method is capable of identifying an event that is prone to causing traffic increases at later times so that a future increase in traffic can be anticipated in a predictive manner. The method determines the event by processing probe data, mitigating the challenges associated with techniques that exclusively rely on web crawling techniques for determining events.

The event may be an event that is not a regularly recurring event.

The event may be an event that is a recurring event.

The event may be an event that, upon termination, gives rise to an increase in traffic when vehicles parked in the area start leaving the area.

The method may comprise causing the identified occurrence of the event to be used for performing one or several operations.

The one or several operations may comprise one or several operations that are dependent on a predicted future increase in traffic caused by the event.

The one or several operations may comprise one, several, or all of navigation-related operations (such as route guidance, estimated time of arrival (ETA) determination, autonomous driving), electronic map-related operations (such as updating information of an electronic map in an intermittent manner), traffic flow management related operations (such as controlling electronically controllable traffic flow regulating devices).

The one or several operations may be selected from a group comprising or consisting of: traffic flow control, dynamic vehicle route guidance, an autonomous driving operation, updating digital map information, traffic warnings, point of interest (POI) identification, POI ranking.

The probe data may comprise or may be probe traces for a plurality of probes. A probe trace may specify a location of the respective probe as a function of time (e.g., by specifying a cell of a plurality of cells in which the probe is located).

The probe data may comprise or may be information on a location (e.g., a cell) in which a probe trace starts and an associated start time and/or information on a location (e.g., a cell) in which a probe trace ends and an associated end time.

The probe traces may comprise probe traces of probes that are removably or fixedly installed in or on vehicles or that can be removably provided in or on vehicles.

The probe traces may comprise probe traces of portable probes.

At least the steps of processing the probe data and identifying the occurrence of the event may be performed in a map-agnostic manner (e.g., without using electronic map information).

The step of causing the operation to be performed may be implemented in a map-agnostic manner (e.g., without using electronic map information).

The method may comprise a predictive determination of a predicted future traffic increase based on the identified occurrence of the event.

The one or several operations may be dependent on the predicted future traffic increase.

The area may be a cell of a cell array.

The cell array may comprise a regular array of cells.

Determining the change in the number of vehicles parked in the area may comprise determining, for each one of several cells of the cell array, a number of probe traces terminating in the respective cell and/or a number of probe traces starting in the respective cell.

Determining a number of probe traces terminating in the respective cell may comprise one or several of identifying probe traces for which a last trace location prior to termination is located within the respective cell and/or for which a time-dependence of a location as indicated by the probe trace fulfills a first criterion.

The first criterion may comprise a correlation with known probe traces that are known to terminate and/or a first threshold comparison of a location change per time specified by the probe trace.

Determining a number of probe traces starting in the respective cell may comprise one or several of identifying probe traces for which an initial trace location of the probe trace is located within the respective cell and/or for which a time-dependence of a location specified by the probe trace fulfills a second criterion.

The second criterion may comprise a correlation with known probe traces that are known to start and/or a second threshold comparison of a location change per time specified by the probe trace.

Determining the change in the number of vehicles parked in the area may comprise determining, for each one of several cells of the cell array, an inflow of vehicles into the respective cell and/or an outflow of vehicles from the respective cell.

Determining the change in the number of vehicles parked in the area may comprise identifying, based at least on the probe data, vehicle trips terminating or starting within the area.

Identifying the occurrence of the event may comprise one, several, or all of:
- a threshold comparison of the change in the number of vehicles parked in the area;
- a correlation of the change in the number of vehicles as a function of time with previously recorded time-dependent changes that are known to be caused by events;
- proximity of the area to a known POI;
- processing time-series data indicative of one or several of the change in the number of vehicles, an inflow of vehicles, an outflow of vehicles using an artificial intelligence (AI) model.

The AI model may have an input layer operative to receive samples of the time series data and an output layer operative to provide an AI model output indicative of occurrence of an event.

Identifying the occurrence of the event and/or causing one or several operations to be performed may comprise combining the determined change in the number of vehicles with information different from the probe data.

The information different from the probe data may comprise one or several of:
- information on at least one POI located within or in spatial proximity to the area;
- information on scheduled events retrieved via a wide area network (WAN).

The method may further comprise accessing map data and identifying points of interest, POIs, based at least on the map data, wherein one, several or all of the following apply:
- identifying the occurrence of the event may comprise determining whether at least one of the POIs is located within or in spatial proximity to the area;
- the map data is updated to include a new POI if the occurrence of the event is determined and none of the POIs is in proximity to the area;
- the map data is updated to include additional information for an existing POI located within or in spatial proximity to the area.

The additional information may comprise information that is added temporarily to the POI and deleted after the event.

The method may further comprise determining an expected duration of the event.

Determining the expected duration may comprise one, several or all of:
- correlating the change in the number of vehicles parked in the area with previously observed changes in the number of parked vehicles in the same area or other areas and previously observed event durations;
- retrieving information on the expected duration over a wide area network, WAN;
- retrieving information on an event type of the event over a WAN and determining the expected duration based on the event type;
- processing time-series data indicative of one or several of the change in the number of vehicles, an inflow of vehicles, an outflow of vehicles using an AI mode. The AI model may have an input layer operative to receive samples of the time series data and an output layer operative to provide an expected duration of the event.

At least one of traffic flow control, dynamic vehicle route guidance, an autonomous driving operation, updating digital map information, traffic warnings, POI identification, POI ranking based at least on the identified occurrence of the event and the expected duration of the event.

The event may be an event creating a future outflow of vehicles from the area.

The event may be a gathering of a number of people exceeding a size threshold.

The gathering may comprise at least one of a sports event, a cultural event, an exhibition, a trade fair, a concert, a theater event, a demonstration.

The method may further comprise one, several, or all of:
- receiving, by the processing system, the probe data, optionally wherein the probe data is received from a wireless communication system;
- providing, by the processing system, information on the identified occurrence of the event to probes located within the area and/or probes not located within the area;
- providing, by the processing system, information on the identified occurrence of the event to a traffic management system;
- providing, by the processing system, information on the identified occurrence of the event to map server system.

The method may comprise performing, by the processing system or a system or device communicatively coupled to the processing system, the one or several operations.

According to another embodiment of the invention, there is disclosed machine-readable instruction code which, when executed by at least one programmable circuit, causes the at least one programmable circuit to perform the method according to an embodiment.

According to another embodiment of the invention, there is disclosed machine-readable instruction code which, when executed by at least one programmable circuit, causes the programmable circuit to
- process probe data to determine a change in a number of vehicles parked in an area, the probe data comprising information on probe traces for a plurality of probes, and identify occurrence of an event based at least on the determined change in the number of vehicles parked in the area.

The instruction code may further comprise instructions which, when executed by at least one programmable circuit, cause the programmable circuit to cause the identified occurrence of the event to be used for performing one or several operations.

The one or several operations may comprise one or several operations that are dependent on a predicted future increase in traffic caused by the event.

The one or several operations may comprise one, several, or all of navigation-related operations (such as route guidance, ETA, autonomous driving), electronic map-related operations (such as updating information of an electronic map in an intermittent manner), traffic flow related operations (such as controlling electronically controllable traffic flow regulating devices).

The one or several operations may be selected from a group comprising or consisting of: traffic flow control, dynamic vehicle route guidance, an autonomous driving operation, updating digital map information, traffic warnings, point of interest (POI) identification, POI ranking.

According to another embodiment of the invention, there is disclosed a storage medium on which the instruction code is stored.

The storage medium may be a non-volatile storage medium.

According to another embodiment of the invention, there is discloses a signal sequence having encoded therein the instruction code according to an embodiment.

According to another embodiment of the invention, there is disclosed a traffic prediction method of predicting a future traffic increase caused by an event, the traffic prediction method comprising the method of processing probe data according to an embodiment.

According to another embodiment of the invention, there is disclosed a navigation method of performing at least one vehicle navigation task responsive to an expected future traffic increase caused by an event, the navigation method comprising the method of processing probe data according to an embodiment to detect occurrence of the event and executing, by the processing system or a device (such as a probe) or system different from the processing system, a navigation task responsive to the identified event.

The navigation task may comprise outputting the traffic warning.

The navigation task may comprise performing a route guidance responsive to the identified event. Performing the route guidance may comprise intermittently modifying road segment characteristics (such as time or fuel consumption) used in a route search process. Performing the route guidance may comprise executing a route search with road segment characteristics (such as time or fuel consumption) being temporarily increased for planned journeys that cause the vehicle to pass through the area or a region surrounding the area in a time period at about the end of the event.

The navigation task may comprise performing an autonomous driving operation responsive to the identified event. Performing the autonomous driving operation may comprise intermittently modifying a vehicle steering direction and/or vehicle speed in an autonomous driving operation responsive to the identified event. Performing the autonomous driving operation may comprise being modifying the vehicle steering direction and/or vehicle speed in an autonomous driving operation to cause the vehicle to bypass the area or a region surrounding the area in a time period at about the end of the event. Performing the autonomous driving operation may comprise controlling one or several actuator(s), such as actuators that affect wheel direction and/or engine speed. Performing the autonomous driving operation may comprise issuing control signals or control commands to control one or several actuator(s), such as actuators that affect wheel direction and/or engine speed, to cause the vehicle to bypass the area or a region surrounding the area in a time period at about the end of the event.

According to another embodiment of the invention, there is disclosed a map management method of performing at least one electronic map-related task responsive to an expected future traffic increase caused by an event, the map management method comprising the method of processing probe data according to an embodiment to detect occurrence of the event and executing, by the processing system or a device or system (such as a map server) different from the processing system, a map update function responsive to the identified event.

The map update function may comprise adding a new POI.

The map update function may comprise intermittently or permanently modifying an existing POI.

The map management method may comprise providing data of the electronic map with the new POI or modified POI to a terminal device.

The data of the electronic map may be provided using a pull or push mechanism.

According to another embodiment of the invention, there is disclosed a traffic flow control method of performing at least one traffic flow control operation responsive to an expected future traffic increase caused by an event, the traffic flow control method comprising the method of processing probe data according to an embodiment to detect occurrence of the event and executing, by the processing system or a device or system (such as a dedicated traffic control system) different from the processing system, a traffic flow control operation responsive to the identified event.

The traffic flow control operation may comprise controlling at least one traffic flow regulating device (such as a traffic light, an adjustable speed limit, and/or a lane designation) in a manner that depends on the identified event.

The traffic flow control operation may comprise controlling at least one traffic flow regulating device (such as a traffic light, an adjustable speed limit, and/or a lane designation) so as to mitigate traffic slow-down caused by the temporary increase in traffic at the end of the identified event.

According to another embodiment of the invention, there is disclosed a vehicle control method, the vehicle control method comprising the method of processing probe data according to an embodiment to detect occurrence of the event and performing, by an autonomous vehicle, at least one autonomous driving operation responsive to the identified event.

Performing the autonomous driving operation may comprise intermittently modifying a vehicle steering direction and/or vehicle speed in an autonomous driving operation responsive to the identified event.

Performing the autonomous driving operation may comprise modifying the vehicle steering direction and/or vehicle speed in an autonomous driving operation to cause the vehicle to bypass the area or a region surrounding the area in a time period at about the end of the event.

Performing the autonomous driving operation may comprise controlling one or several actuator(s), such as actuators that affect wheel direction and/or engine speed.

Performing the autonomous driving operation may comprise issuing control signals or control commands to control one or several actuator(s), such as actuators that affect wheel direction and/or engine speed, to cause the vehicle to bypass the area or a region surrounding the area in a time period at about the end of the event.

A processing system for processing probe data may comprise an interface operative to receive probe data, the probe data comprising information on probe traces for a plurality of probes.

The processing system comprises at least one circuit, which may be operative to process the probe data to determine a change in a number of vehicles parked in an area and identify occurrence of an event based at least on the determined change.

The processing system is operative for identifying an event that is prone to causing traffic increases at later times so that a future increase in traffic can be anticipated in a predictive manner. The processing system determines the event by processing probe data, mitigating the challenges associated with techniques that exclusively rely on web crawling techniques for determining events.

The event may be an event that is not a regularly recurring event.

The event may be an event that is a recurring event.

The event may be an event that, upon termination, gives rise to an increase in traffic when vehicles parked in the area start leaving the area.

The processing system may be operative to cause the identified occurrence of the event to be used for performing one or several operations.

The one or several operations may comprise one or several operations that are dependent on a predicted future increase in traffic caused by the event.

The one or several operations may comprise one, several, or all of navigation-related operations (such as route guidance, ETA, autonomous driving), electronic map-related operations (such as updating information of an electronic map in an intermittent manner), traffic flow related operations (such as controlling electronically controllable traffic flow regulating devices).

The one or several operations may be selected from a group comprising or consisting of: traffic flow control, dynamic vehicle route guidance, an autonomous driving operation, updating digital map information, traffic warnings, POI identification, POI ranking.

The probe data may comprise or may be probe traces for a plurality of probes. A probe trace may specify a location of the respective probe as a function of time (e.g., by specifying a cell of a plurality of cells in which the probe is located).

The probe data may comprise or may be information on a location (e.g., a cell) in which a probe trace starts and an associated start time and/or information on a location (e.g., a cell) in which a probe trace ends and an associated end time.

The probe traces may comprise probe traces of probes that are removably or fixedly installed in or on vehicles or that are otherwise removably provided in or on vehicles.

The probe traces may comprise probe traces of portable probes.

The processing system may be operative such that at least processing the probe data and identifying the occurrence of the event may be performed in a map-agnostic manner (e.g., without without using electronic map information).

The processing system may be operative such that it causes the operation to be performed in a map-agnostic manner (e.g., without using electronic map information).

The processing system may be operative to perform a predictive determination of a predicted future traffic increase based on the identified occurrence of the event.

The one or several operations may be dependent on the predicted future traffic increase.

The area may be a cell of a cell array.

The cell array may comprise a regular array of cells.

The processing system may be operative such that determining the change in the number of vehicles parked in the area may comprise determining, for each one of several cells of the cell array, a number of probe traces terminating in the respective cell and/or a number of probe traces starting in the respective cell.

The processing system may be operative such that determining a number of probe traces terminating in the respective cell may comprise one or several of identifying probe traces for which a last trace location prior to termination is located within the respective cell and/or for which a time-dependence of a location as indicated by the probe trace fulfills a first criterion.

The first criterion may comprise a correlation with known probe traces that are known to terminate and/or a first threshold comparison of a location change per time specified by the probe trace.

The processing system may be operative such that determining a number of probe traces starting in the respective cell may comprise one or several of identifying probe traces for which an initial trace location of the probe trace is located within the respective cell and/or for which a time-dependence of a location specified by the probe trace fulfills a second criterion.

The second criterion may comprise a correlation with known probe traces that are known to start and/or a second threshold comparison of a location change per time specified by the probe trace.

The processing system may be operative such that determining the change in the number of vehicles parked in the area may comprise determining, for each one of several cells of the cell array, an inflow of vehicles into the respective cell and/or an outflow of vehicles from the respective cell.

The processing system may be operative such that determining the change in the number of vehicles parked in the area may comprise identifying, based at least on the probe data, vehicle trips terminating or starting within the area.

The processing system may be operative such that identifying the occurrence of the event may comprise one, several, or all of:
  a threshold comparison of the change in the number of vehicles parked in the area;
  a correlation of the change in the number of vehicles as a function of time with previously recorded time-dependent changes that are known to be caused by events;
  proximity of the area to a known POI;
  processing time-series data indicative of one or several of the change in the number of vehicles, an inflow of vehicles, an outflow of vehicles using an artificial intelligence (AI) model.

The AI model may have an input layer operative to receive samples of the time series data and an output layer operative to provide an AI model output indicative of occurrence of an event.

The processing system may be operative such that identifying the occurrence of the event and/or causing one or several operations to be performed may comprise combining the determined change in the number of vehicles with information different from the probe data.

The information different from the probe data may comprise one or several of:
  information on at least one POI located within or in spatial proximity to the area;
  information on scheduled events retrieved via a wide area network (WAN).

The processing system may further be operative for accessing map data and identifying POIs based at least on the map data, wherein one, several or all of the following apply:
  identifying the occurrence of the event may comprise determining whether at least one of the POIs is located within or in spatial proximity to the area;
  the map data is updated to include a new POI if the occurrence of the event is determined and none of the POIs is in proximity to the area;
  the map data is updated to include additional information for an existing POI located within or in spatial proximity to the area.

The additional information may comprise information that is added temporarily to the POI and deleted after the event.

The processing system may further be operative for determining an expected duration of the event.

The processing system may be operative such that determining the expected duration may comprise one, several or all of:
  correlating the change in the number of vehicles parked in the area with previously observed changes in the number of parked vehicles in the same area or other areas and previously observed event durations;
  retrieving information on the expected duration over a wide area network, WAN;
  retrieving information on an event type of the event over a WAN and determining the expected duration based on the event type;
  processing time-series data indicative of one or several of the change in the number of vehicles, an inflow of vehicles, an outflow of vehicles using an AI mode. The AI model may have an input layer operative to receive samples of the time series data and an output layer operative to provide an expected duration of the event.

The processing system may be operative such that at least one of traffic flow control, dynamic vehicle route guidance, an autonomous driving operation, updating digital map information, traffic warnings, POI identification, POI ranking is based at least on the identified occurrence of the event and the expected duration.

The event may be an event creating a future outflow of vehicles from the area.

The event may be a gathering of a number of people exceeding a size threshold.

The gathering may comprise at least one of a sports event, a cultural event, an exhibition, a trade fair, a concert, a theater event, a demonstration.

The method may further comprise one, several, or all of:
  receiving, by the processing system, the probe data, optionally wherein the probe data is received from a wireless communication system;
  providing, by the processing system, information on the identified occurrence of the event to probes located within the area and/or probes not located within the area;
  providing, by the processing system, information on the identified occurrence of the event to a traffic management system;
  providing, by the processing system, information on the identified occurrence of the event to map server system.

The processing system may be operative to perform the method of an embodiment.

A probe according to an embodiment may comprise at least one probe interface operative to transmit information on a probe trace that depends on a time-dependence of a location of the probe and receive information on an identified occurrence of an event. The probe may comprise at least one probe circuit operative to use the information on the identified occurrence of the event for at least one of dynamic vehicle route guidance, an autonomous driving operation, or outputting a traffic warning.

The information on the identified occurrence of the event may be information determined by the method according to an embodiment.

The information on the identified occurrence of the event may be information determined by a processing system according to an embodiment.

The probe circuit may be operative to perform route guidance, an autonomous driving operation, and/or output traffic warnings based on a predicted increase in traffic flow caused by an outflow of vehicle from the area predicted to occur when the event ends.

The probe may be a probe fixedly installed in a vehicle.

The probe may be a probe removably arrangeable in or on a vehicle.

A traffic flow control system according to an embodiment may comprise at least one traffic flow control system interface operative to receive information on an identified occurrence of an event. The traffic flow control system may comprise at least one circuit operative to use the information on the identified occurrence of the event for controlling electronically controllable devices that regulate traffic flow (such as traffic lights, electronically controllable speed limits, and/or electronically controllable lane designations).

The information on the identified occurrence of the event may be information determined by the method according to an embodiment.

The information on the identified occurrence of the event may be information determined by a processing system according to an embodiment.

The traffic flow control system may further comprise electronically controllable devices that regulate traffic flow (such as traffic lights, electronically controllable speed limits, and/or electronically controllable lane designations).

The traffic flow control system may be operative to control the electronically controllable devices based on a predicted increase in traffic flow caused by an outflow of vehicle from the area predicted to when the event ends.

The traffic flow control system may be operative to take a control action that allows the outflow of vehicles to leave the area more rapidly than without the control action.

A map server according to an embodiment may comprise at least one map server interface operative to receive information on an identified occurrence of an event. The map server may comprise at least one map server circuit operative to use the information on the identified occurrence of the event for at least temporarily updating an electronic map. Temporarily updating the electronic map may comprise adding a POI and/or updating POI information.

The information on the identified occurrence of the event may be information determined by the method according to an embodiment.

The information on the identified occurrence of the event may be information determined by a processing system according to an embodiment.

The map server may be operative to provide electronic map data to terminal devices. This may be done in a push or pull mechanism, for example.

The map server may be separate from the traffic information server.

The map server may be integrated with or communicatively coupled to a traffic information server. Both the map server and the traffic information server may receive and use information on the identified occurrence of the event.

According to another embodiment of the invention, there is disclosed a vehicle comprising one or several actuators for adjusting a vehicle driving direction and/or vehicle speed, the vehicle further comprising a wireless interface operative to receive information on the identified event and one or several vehicle control circuits operative to control the one or several actuators responsive to at least the information on the identified event.

The one or several vehicle control circuits operative may be operative such that performing the autonomous driving operation may comprise intermittently modifying a vehicle steering direction and/or vehicle speed in an autonomous driving operation responsive to the identified event.

The one or several vehicle control circuits operative may be operative such that performing the autonomous driving operation may comprise being modifying the vehicle steering direction and/or vehicle speed in an autonomous driving operation to cause the vehicle to bypass the area or a region surrounding the area in a time period at about the end of the event.

The one or several vehicle control circuits operative may be operative such that performing the autonomous driving operation may comprise controlling one or several actuator(s), such as actuators that affect wheel direction and/or engine speed.

The one or several vehicle control circuits operative may be operative such that performing the autonomous driving operation may comprise issuing control signals or control commands to control one or several actuator(s), such as actuators that affect wheel direction and/or engine speed, to cause the vehicle to bypass the area or a region surrounding the area in a time period at about the end of the event.

A system is disclosed which comprises the processing system and/or one or several probes according to embodiments.

The system may further comprise a traffic flow control system interfaced with the processing system and operative for performing traffic flow control responsive to the identified occurrence of the event and/or a map server operative to update map information responsive to the identified occurrence of the event and/or a vehicle interfaced with the processing system and operative for performing an autonomous driving operation responsive to the identified event.

According to further embodiments, there is disclosed a use of probe trace data for predicting a future increase in a traffic outflow from an area.

The use may comprise processing the probe data using a method and/or system according to an embodiment disclosed herein.

Various effects and advantages are attained by embodiments of the invention. The methods, systems, and devices, allow an increase in an outflow of vehicles from an area associated with an event to be predicted. The methods, systems, and devices are operable for predicting increases in traffic even when the event is not regularly recurring. While the methods, systems, and devices may be operative to predict event-related increases in traffic even when the event is not regularly recurring, the methods, systems, and devices can predict such increases also for recurring (e.g., periodically recurring) events. The methods, systems, and devices are operable for predicting increases in traffic even when the event is a sporadically occurring event, such as a one-time event.

Various additional effects and advantages are attainable by embodiments of the invention. For illustration, when the identified event is used for performing traffic flow control, traffic can be routed more efficiently at the end of the event (event starting prior to the end of the event), mitigating the risk of traffic jams and thereby reducing energy consumption and air pollution.

For further illustration, when the identified event is used for performing dynamic vehicle route guidance, the risk of the vehicle being stuck in an increased traffic situation is reduced, thereby reducing energy consumption and air pollution.

For further illustration, when the identified event is used for performing an autonomous driving operation, the risk of the vehicle being stuck in an increased traffic situation is reduced, thereby reducing energy consumption and air pollution.

For further illustration, when the identified event is used for updating digital map information, the digital map information is modified so as to provide more accurate information. More accurate information allows terminal devices to more readily retrieve correct, updated information desired by end users, thereby reducing data traffic loads and alleviating possible data traffic bottleneck situations.

For further illustration, when the identified event is used for issuing traffic warnings, improved predictive information is provided, mitigating the risk of undesired traffic jam situations and improving safety.

For further illustration, when the identified event is used for point of interest (POI) identification and/or POI ranking, more accurate POI information is made available. More accurate POI information allows terminal devices to more readily retrieve correct, updated POI information desired by end users, thereby reducing data traffic loads and alleviating possible data traffic bottleneck situations.

The methods, systems, and devices are operable for predicting increases in traffic even when no information on an event that causes the traffic increase is available from web crawling techniques. This mitigates the challenges associated with identifying events by searching for event related data in publicly available resources, which may be challenging in view of language issues, website access restrictions, etc.

BRIEF DESCRIPTION OF THE DRAWINGS

Embodiments of the invention will be described with reference to the drawings in which similar or corresponding reference signs designate elements having similar or corresponding configuration and/or function.

DETAILED DESCRIPTION OF EMBODIMENTS

Figure 1:
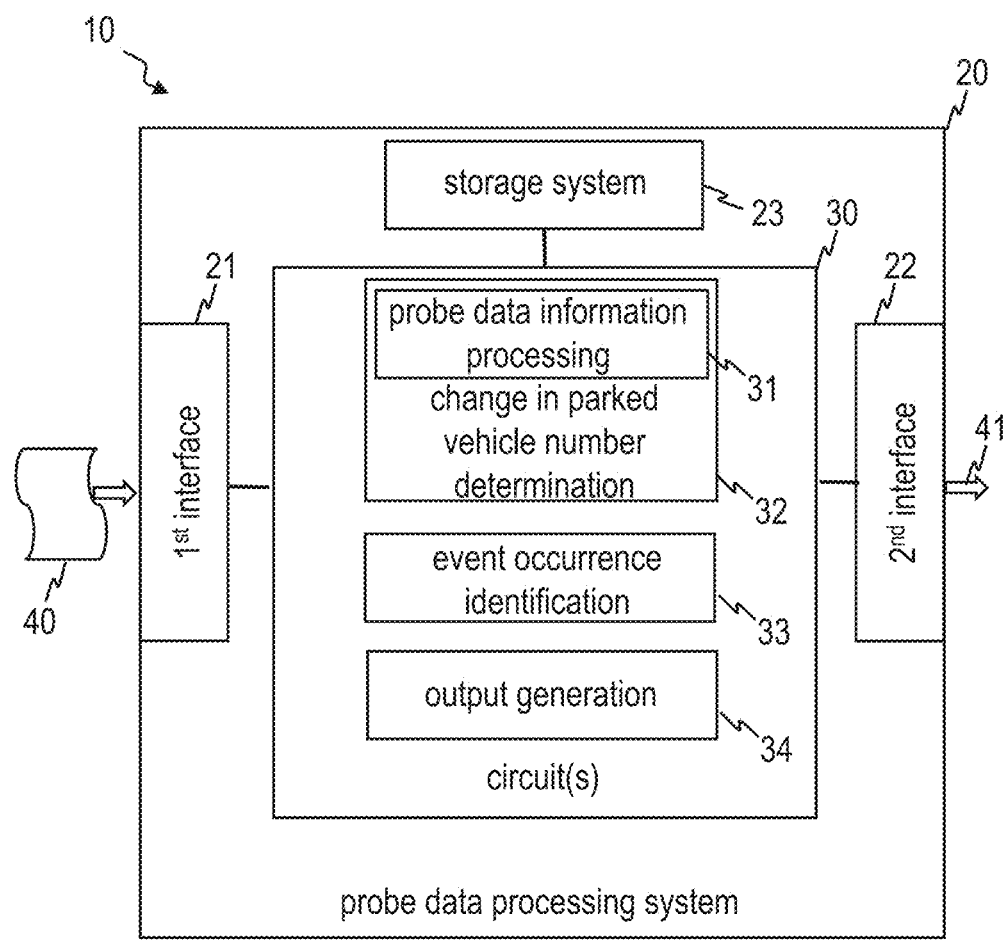
FIG. 1 is a block diagram of a probe data processing system.

Embodiments of the invention will be described in detail. While embodiments will be described in association with detecting events, such as sport events or cultural events, that have a size sufficiently large to impact future traffic, the embodiments are not limited thereto.

The features of embodiments may be combined with each other unless specifically stated otherwise.

Methods, processing systems, and devices are disclosed that allow events such as major meetings, social gatherings, or other events associated with temporarily increased traffic to be detected. The methods, processing systems, and devices may be operative to perform a real-time ma p-agnostic detection of such events (e.g., major meetings) to predict future delays. The methods, processing systems, and devices may be operative to perform at least one operation responsive to the detected event, e.g., by considering the expected increase in traffic flow at the end of the event when performing route guidance, an autonomous driving operation, or issuing a traffic warning, when managing electronic map data, and/or when performing traffic flow control.

The methods, processing systems, and devices may be operative to process probe data. As used herein, the "probe data" may be or may comprise a location trace. The location trace may be a GPS trace, a Galileo trace, another global navigation satellite system (GNSS), or Floating car data, without being limited thereto. The probe data may be or may comprise information derived from a location trace. The probe data may indicate, for any vehicle for which a location trace ends in an area (which may be used as an indicator for a parking operation), an identifier for the area and a time at which the trace ends, indicating that the vehicle is parked. The probe data may indicate, for any vehicle for which a location trace starts in an area (which may be used as an indicator for an end of a parking operation), an identifier for the area and a time at which the trace starts, indicating that the parking operation ends.

The term "probe" as used herein encompasses a navigation device but need not be limited thereto. Probe data may indicate probe traces also for devices that do not perform navigation-related functions. A probe may be an in-dashboard navigation device, a portable navigation device (PND), a mobile terminal (MT) of a cellular communication network (e.g., a smartphone) that may (but does not need to) perform a navigation-related operation, without being limited thereto.

The term "navigation device" has used herein encompasses an in-dashboard navigation device, a portable navigation device (PND), a mobile terminal (MT) of a cellular communication network that performs a navigation-related function, such as a smartphone, without being limited thereto.

The methods, processing systems, and devices may be operative to perform the identification of an event in a map-agnostic manner. As used herein, the term "map-agnostic" may designate acts that are performed without knowledge of geolocations, e.g., without knowledge of roads. The identification of an event may be performed using a cellular structure. Cell labels may be used to determine areas in which vehicles are parked and/or in which vehicles start driving.

The methods, processing systems, and devices may be operative to use a "grid" or "cell array." As used herein, the "grid" or "cell array" may represent an array of cells. The grid or cell array may comprise or consist of a contiguous array of cells. The cells may be non-overlapping or may be partially overlapping. The cells may have a radius of at most 1 km, at most 0.9 km, at most 0.8 km, at most 0.7 km, at most 0.6 km, at most 0.5 km, at most 0.4 km, at most 0.3 km, at most 0.2 km, at most 0.1 km or 0.1 km. The cells may have greater radii. For illustration, the cells may have a radius of at most 50 km, at most 40 km, at most 30 km, at most 20 km, at most 15 km, at most 10 km, at most 8 km, at most 5 km, at most 4 km, at most 3 km, at most 2 km, without being limited thereto. For any cell, a cell diameter may be determined by (a) determining an intersection point distance between two intersection points of a straight line with a cell boundary of the cell, with the straight line having a direction, and (b) determining the cell diameter as maximum of the intersection point distances, with the maximum being determined for any direction of the straight line. The radius may be defined as half the cell diameter. The grid or cell array may be a global roster of map agnostic cells. The cells may have a radius as mentioned above. The grid or cell array may be regular or irregular. The grid or cell array may comprise or consist of cells having identical geometrical shape and/or size. The grid or cell array may comprise or consist of cells having varying geometrical shapes and/or sizes.

As used herein, a "cell" refers to a two-dimensional structure. A cell may be identified by an identifier. The identifier may be unique to the cell. Knowledge of a geolocation of a cell may not be required for identifying an event when the probe data indicates the cell (i.e., by specifying the cell identifier) in which probe traces start and/or end. A cell can be any shape. The cell can have a shape selected from hexagonal, circle, square, rectangle, without being limited thereto.

As used herein, "real time" may designate a process that is operative as data are being received and processed. For illustration, probe traces may be transmitted on an ongoing or intermittent basis. Probe trace data may be received with a delay that may be, e.g., on the order of 15 minutes or less. Changes in a number of parked vehicles may require some time to build up to a degree that is sufficient in size to meet a criterion (such as a threshold criterion, a criterion applied to a correlation function, etc.) for which an event is identified. By comparison, processes that use aggregated historic data only are not real-time.

The methods, systems, and devices disclosed herein may be operative to perform dynamic route search based at least on an identified event (optionally including an anticipated event duration). As used herein, the term "dynamic route search" relates to a route search that takes into account changing traffic conditions. In the instant case, the traffic changes predicted to occur at the end of the event may be taken into account. This may be done in various ways, e.g., by dynamically adjusting the time and/or fuel consumption assigned to a road segment in a route search in a time-dependent manner. For illustration, the time and/or fuel consumption assigned to a road segment may be increased for times shortly after the predicted end of the event.

The methods, systems, and devices disclosed herein may be operative to detect events (such as social gathering events) in real time from probe trip-starts or -ends having a high occurrence at a location. The methods, systems, and devices may use this information to predict the start and duration of large traffic outflow at the location at which the event is identified, e.g., a given time (such as a few hours) later.

Such predictive information that is also operative for events that do not occur on a regularly recurring basis (such as one-time events or other irregularly recurring events or other sporadically occurring events) is very valuable for various purposes. Such predictive information is otherwise hard to obtain.

Thus, the methods, systems, and devices are operative to obtain global traffic prediction information in a scalable and automatic way.

The methods, systems, and devices disclosed herein may be operative to infer traffic predictions related to events that have a future impact on traffic for the next hours by providing an automatic, real time and global source for important gatherings (events that see a large traffic inflow) that ingest a lot of traffic and thus will have an important outflow a certain time later in the local area. By comparison, conventional systems typically rely on the detection of current existing traffic jams (delays on features that represent roads) and modelling the dissipation of these (growing backwards and shrinking), or on the typical historical speeds/delays at a given time on a road as specified by historic information. Current techniques do not accommodate the prediction of the onset of major outflow due to social events or migration destinations at random places unrelated to map info, using probe data as a source of the detection.

The methods, systems, and devices may allow a prediction of important traffic buildup in the near future on any location globally, without the need to aggregate (or at least without relying exclusively on) event information from a massive amount of independent and/or unknown event organizers and calendars all speaking different languages, events sometimes even unannounced or occurring spontaneously but still detectable by this system.

The methods, systems, and devices may provide a map agnostic method to detect crowded destinations, also referred to as "event locations," as they occur, by analyzing real-time probe trip begin/end locations aggregated (e.g., by summing of trip-end or -start occurrences) in cells of a cell array that in a time window (of, e.g., the last 15 min) have an certain amount (e.g., a threshold such as 25) route-ends (or -starts). To identify events, trips (i.e., probe traces) that start or end in a cell are considered. Trips that enter and leave a cell within a set time window are not counted, only probe traces that end in the cell. I.e., traces are counted if there are no more probe updates from that device ID (which may be an anonymized device ID) within a time period.

The methods, systems, and devices may use a cell size, time window and/or count threshold so as to retain only events of a certain magnitude (using, e.g., as reference a location with a known publicized event as validation) while not being triggered with unimportant gatherings that do not significantly affect traffic after completion.

The methods, systems, and devices may be operative to detect any major static event attracting lots of visitors without any pre-knowledge. Examples of such events are cinema premieres, sport events, festivals, manifestations, expositions, concerts, without being limited thereto. The methods, systems, and devices do not require any pre-installation of sensors onsite in the area.

The methods, systems, and devices may be operative to infer an expected event duration based on historical data for, e.g., the same area (e.g., the same cell and/or adjacent cells) and/or for similar time-dependent changes in a number of vehicles that remain in an area. Historic data collected over a period (which may be, e.g., a few weeks) may allow a characteristic event-duration (time between major inflow and outflow) to be inferred. Correlation techniques may be used for this purpose. For periodically recurring events, an occurrence frequency (such as daily/weekly/monthly) of a specific cell location can be detected by autocorrelation.

The methods, systems, and devices may be operative to take advantage of the predicted future traffic associated with the end of an event. For illustration, knowledge of traffic attractor (or generator) locations is very valuable for the following use cases, without being limited thereto:

Generation of near future prediction of increased traffic and/or delays around the identified area (e.g., cell) around the time when the outflow of that cell is typically occurring (at the end of the typical event duration of that cell).

Realtime information (situational overview) of the occurrence & location of large gatherings in a broader region (e.g., country) for, e.g., government, traffic centers, community that wants to avoid crowded locations.

Archived historical info about these detected events for overview, analysis, and/or ground truth (e.g., event overview alert website or dashboard for outputting via a human-machine interface, like traffic index; such use cases may be implemented in addition or alternatively to machine-to-machine (M2M) live traffic feed for navigation and/or estimated time of arrival (ETA) use case)

Modification, updating and/or improvement of an electronic map, such as by addition, modification, updating, and/or improving point of interest (POI) information (e.g., detecting missing important venues and/or assigning or updating an importance ranking).

The methods, systems, and devices may be operative to assign meta data to the detected events about their most probable nature. The methods, systems, and devices may be operative to assign the metadata using, e.g., map-information like proximity of leisure POI (stadia, sport-field, exhibition venue . . . ) or parking-roads as filter or type-classifier for the detected event;

reverse geocoding of the triggered cell location to get a rough location or area name;

detecting the name of a close-by leisure POI or parking area;

crawling the web for event information about this location (nature of event, documented duration, expected audience size . . . ).

The methods, systems, and devices may be operative to use the information about an event identified from probe data in various ways, e.g., by for any one or any combination of:

triggering traffic servers (such as a traffic server state machine) to anticipate increased traffic outflow from a cell at a time in the near future (e.g., less than 5 hours in the future and/or more than 0.2 hours in the future);

triggering routing, navigation, and/or estimated time of arrival (ETA) functions;

triggering one or several of POI presence, importance verification, validation, update in an electronic map based on a net-instream of probe traces that end in an area (e.g., a threshold count in a certain period, such as at least 300 or at least 3000 or at least 30000 vehicles in an hour).

The methods, systems, and devices may be operative to provide and use future event information (like "international football match ongoing, expect major traffic in 1 hour coming out of area") that is not readily available with conventional techniques when processing probe data.

Reference will next be made to the drawings in which similar or corresponding reference signs designate elements with similar or corresponding configuration and/or function.

FIG. 1 is a block diagram of a probe data processing system 20. The probe data processing system 20 may be comprised by a system 10 that additionally includes a source of probe data 40 and/or systems or devices that execute or are otherwise operative responsive to an output 41 of the probe data processing system 20.

The probe data processing system 20 comprises a first interface 21 operative to receive probe data. The probe data may include information that, for each cell of a plurality of cells, specify or allow the probe data processing system 20 to determine which probe traces terminate within the cell and which probe traces start within the cell, respectively within a time window that may be a sliding time window.

The probe data processing system 20 is operative to process the probe trace to identify, based at least one the probe data, an event that is prone to causing increased traffic outflow from an area in the future. The probe data processing system 20 may be operative to generate and provide an output 41 that depends on a cell (and optionally on geolocations) of an area which has been identified as being associated with increased parking activity. The output 41 may also depend on an expected duration of the event. This allows the probe data processing system 20 to cause execution of at least one operation that takes into account a prediction of a future outflow of traffic from the area.

The probe data processing system 20 comprises one or several circuit(s) 30. The circuit(s) may comprise any one or any combination of integrated circuits, integrated semiconductor circuits, processors, controllers, application specific integrated circuits (ASICs), field programmable gate arrays (FPGAs), circuit(s) including quantum bits (qubits) and/or quantum gates, without being limited thereto.

The circuit(s) 30 may be operative to process the information on the probe data 40. The circuit(s) may execute instruction code to implement a probe data information processing module 31 that identifies vehicles (and in particular vehicles that are not lorries or other utility vehicles, but which transport persons) that are being parked in an area and that identifies vehicles that start operation after having been parked in the area. Such vehicles can be identified based on at least the start points of vehicle traces (such as information on a probe identifier that indicates that a probe trace ends within an area at a certain time or within a time window) and end points of vehicle traces (such as information on a probe identifier that indicates that a probe trace starts within the area at a certain time or within the time window). The net change in number of vehicles parked in the area may thereby be determined by a module 32 that determines the change in the number of parked vehicles. The change in the number of parked vehicles may be determined in a time-dependent manner, e.g., as time-series data with each element of the time series indicating by how many vehicles the number of vehicles parked in the area has changed in a time window preceding the respective point in time.

The circuit(s) may be operative to execute an event occurrence identification module 33. The event occurrence identification module may identify whether or not an even that is likely to create a relevant outflow of vehicles in the future takes place at or close to the area. Various techniques may be used for event identification. A threshold comparison may be employed to distinguish relevant events from conventional fluctuations in the number of parked vehicles and/or from events that do not give rise to a future traffic flow that would have relevant influence on local traffic conditions. Alternatively or additionally, correlation techniques may be used to correlate the time-dependent change in the number of parked vehicles with time-dependent changes previously recorded for that area. Alternatively or additionally, the time-dependent change in the number of parked vehicles may be processed with an artificial intelligence (AI) model. The AI model may be a classifier that provides a binary output indicating whether or not there is a relevant event. The AI model may be operative to output information on the predicted duration of the event.

The circuit(s) may be operative to execute an output generation module 34. The output generation module 34 may provide an interface to one or several types of devices or systems to generate information or commands (encoded in packetized data or control signals, for example). For illustration, the output generation module 34 may be operative to generate output 41 for use by probes (e.g., navigation devices that may be in-dashboard devices or that may be removably arranged in or on vehicles) for, e.g., ETA, route guidance, outputting of traffic warnings;

for use by a map server (e.g., for updating POI information or ranking POIs);

for use by a traffic flow management system (e.g., for controlling electronically controllable devices such as traffic lights);

for use by a traffic warning system (e.g., for issuing traffic warnings);

for use by an autonomous driving system, e.g. for performing autonomous driving operation(s) by an autonomous vehicle.

The circuit(s) 30 may be operative to determine not only whether or not an event takes place that a relevant outflow of traffic from an area but may be operative to predict at which time in the future this increase will occur and/or how the traffic outflow will behave as a function of time. The probe data processing system 20 may comprise a storage system 23 that stores historical data indicating, for each of a plurality of areas, previously observed time-dependent variations of a net increase in parked vehicles (i.e., sum of vehicles entering the area and stopping in the area for a parking operation within a time window, minus sum of vehicles leaving the area within the time window) followed by a subsequent decrease (at the end of the end). The time window is a sliding time window. The previously observed time-dependent variations in the number of parked vehicles may be stored as time series data. The previously observed time-dependent variations may be stored at least for those occurrences for which an increase in the number of parked vehicles was followed by a decrease in the number of parked vehicles (and, thus, an accompanying outflow of vehicles from the area) some time (e.g., a few hours, and less than a day) later, in such a way that the traffic outflow had a significant effect on traffic flow (e.g., by affecting ETAs of vehicles traveling by the area by more than a threshold time, or by causing dynamic route guidance to change planned routes for more than a threshold number of vehicles). When an increase in the number of parked vehicles is observed, the probe data processing system 20 may access the storage system 23 and predict a future outflow, based on the observed increase in the number of parked vehicles and the previously observed changes in the number of parked vehicles in that area (or in similar areas). Various techniques, such as correlation functions, a trained AI model, or other processing may be used to combine the current observed increase in the number of parked vehicles with previously recorded changes (increase followed by a subsequent decrease in the number of parked vehicles as a function of time) to predict a future increase in traffic outflow from the area, including the time at which the increase is likely to occur.

The predictive time horizon may be less than 24 hours, less than 18 hours, less than 12 hours, less than 10 hours, less than 8 hours, or less than 6 hours. The predictive time horizon may be more than 1, more than 1.5 hours, more than 2 hours, more than 2.5 hours, or more than 3 hours.

The predictive time horizon is not limited to the above. For illustration, the predictive time horizon may be greater than 24 hours. For illustration, the predictive time horizon may be 1 day or more, 2 days or more, 3 days or more, 7 days or more, 14 days or more, 21 days or more, 1 month or more, etc. Learning techniques performed by the systems, methods, and devices disclosed herein may allow recurring patterns of events to be automatically detected. For example, sports events that are repeated on a recurring basis while pausing during certain periods (e.g., in summertime and/or during holiday season) may be learned and used in the techniques disclosed herein.

Figure 2:
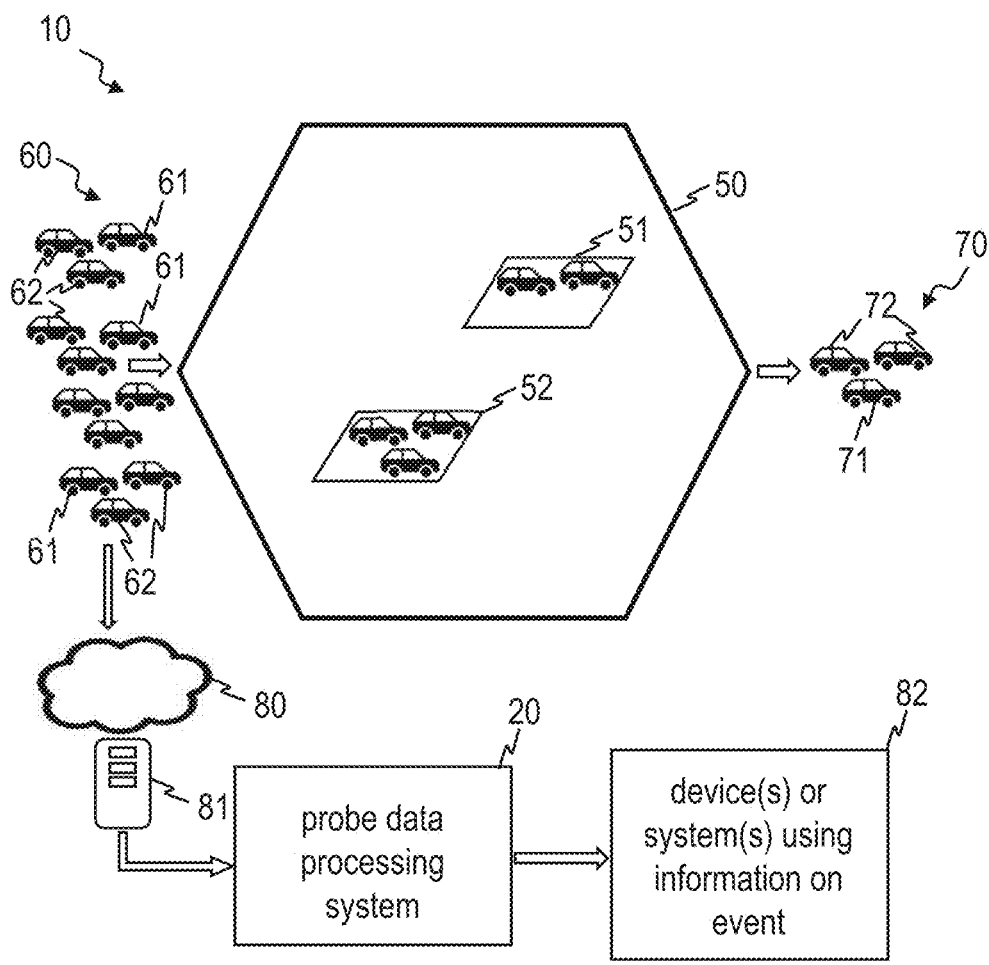
FIG. 2 is a diagram of a system that comprises the probe data processing system.

FIG. 2 is a schematic diagram of a system 10 that comprises the probe data processing system 20. The system 10 may comprise a plurality of probes. The probes may comprise probes that are permanently installed in vehicle. The probes may comprise probes that can be removably provided in or on vehicles. The probes may also comprise probes that are suitable both for vehicular and for non-vehicular use.

Probes may transmit probe traces, such as GNSS traces. Probes may have a wireless interface to transmit the probe traces. The probes may transmit the probe traces over a cellular communication system or another wireless communication network 80. Each probe may have a user interface that allows a user to approve of transmission of the probe trace. Probe traces may be transmitted selectively dependent on user's approval.

Probe traces may be transmitted including an identifier for the respective probe. The identifier may be an anonymous identifier, which does not allow conclusions to be drawn on the identity of the user of the respective probe. The identifier may allow a probe to be identified in a unique manner among all existing probes. The identifier may remain the same for various probe traces originating from the same probe or may change between different probe traces.

Probe traces may be received by a preprocessing computer or server system 81 that may perform certain preprocessing functions. The preprocessing computer or server system 81 may be a proprietary system that processes probe data for probes distributed by a certain probe manufacturer. The preprocessing computer or server system 81 is optional, and the functions thereof may be integrated with the processing system 21. The preprocessing computer or server system 81 may be operative to distinguish, for any probe trace, whether the probe trace shows that a vehicle in which the probe is located
  i. is parked within an area 50 (such as a cell of a cell array) after entering the area 50 within a time window after,
  ii. leaves the area 50 after having been parked in the area 50 within the time window, or
  iii. passes through the area 50 after entering the area 50 within the time window.

To distinguish these scenarios, the computer or server system 81 may be operative to distinguish, for any probe trace, whether the probe trace
  i. ends in the area 50 within the time window,
  ii. starts in the area 50 within the time window, or
  iii. does not end or start in the area 50 within the time window.

Information on the probes for which associated vehicles are parked or start operation after having been parked may be provided to the processing system 20 for further processing.

The output 41 of the processing system 20 may be dependent on whether an event is identified and, in the affirmative, on a predicted duration of the event. The output 41 of the processing system may be provided to device(s) or system(s) 82 that use the output 41 for navigation-related tasks (such as ETA computation, route guidance, travel warnings, autonomous driving operation(s)), map-related tasks (such as POI ranking, POI addition, POI updating), and/or traffic management functions (such as dynamic adjustment of devices that regulate traffic flow, e.g., traffic lights or controllable speed limits).

The probe traces processed by the pre-processing system 81 and/or probe data processing system 20 include probe traces indicating a trace of a first set of vehicles 60 entering the area 50 within a time window. The probe data processing system 20 is operative to identify vehicles 61 from among the first set 60 that are subsequently parked within the area 50 and to identify vehicles 61 from among the first set 60 that are not subsequently parked within the area 50.

The probe traces processed by the pre-processing system 81 and/or probe data processing system 20 include probe traces indicating a trace of a second set of vehicles 70 entering the area 50 within the time window. The probe data processing system 20 is operative to identify vehicles 71 from among the second set 70 that are subsequently parked within the area 50 and to identify vehicles 71 from among the second set 70 that are not subsequently parked within the area 50.

By processing this information, the probe data processing system 20 is operative to determine a change in a number of vehicles parked within the area 50 (e.g., in sets 51, 52 of parked vehicles) for any given time window.

If the probe data includes probe data originating from probes that are not known to be located within vehicles, filtering techniques may optionally be applied to identify those probe traces that indicate movement of a vehicle (such as a car). For illustration, probe traces indicating vehicle movement may be distinguished from probe traces of probes carried along by pedestrians or cyclists based on average velocities. For further illustration, probe traces from indicating vehicle movement may be distinguished from probe traces indicating train, subway, or tram movement by location-based filtering techniques or based on locations of stops (e.g., by filtering out those probe traces that exhibit a pattern of stops that corresponds to that of a public transportation line).

If the probe data includes probe data originating from probes that are collocated with, e.g., lorries or other utility vehicles, such probe data may also be filtered out, based on, e.g., identifiers transmitted with the probe data or characteristic speed profiles (such as lorry-specific speed limits). As the number of parked lorries is frequently negligible, the probe data coming from utility vehicles may be analyzed using the techniques disclosed herein, without being filtered out.

The area 50 may be a cell of a cell array. The cell array may comprise a plurality of cells. The plurality of cells may be arranged in a regular or irregular manner. The plurality of cells may be contiguous, covering at least the land areas of a region (such as a country or continent) or, optionally, at least the land areas in which roads are located.

The change in the number of parked vehicles may be determined for several, optionally for all of the cells of a cell array. The change may be updated in an ongoing manner, e.g., periodically or aperiodically. The time window for which the change in the number of parked vehicles is determines may thus be a sliding time window.

Figure 3:
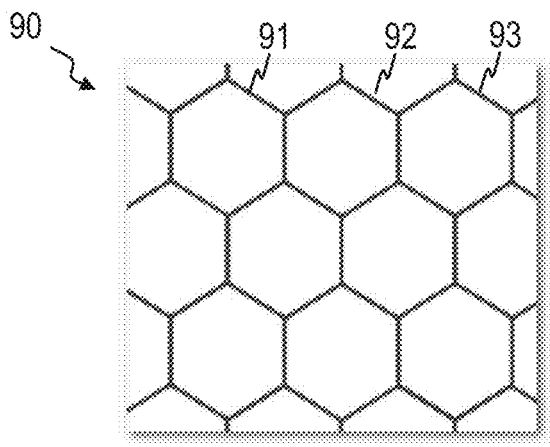
FIG. 3 is a plan view of an array of cells.

FIG. 3 shows a possible cell array 90 comprising a plurality of cells 91-93. The change in the number of parked vehicles may be determines for each cell of the plurality of cells 91-93. Output 41 may be generated in a cell-specific manner to afford navigation functions, POI modifications, and/or traffic management to be performed in a location-dependent manner, depending on where an expected outflow of vehicles is predicted to occur within a future time horizon of, e.g., 12 hours or less.

Figure 4:
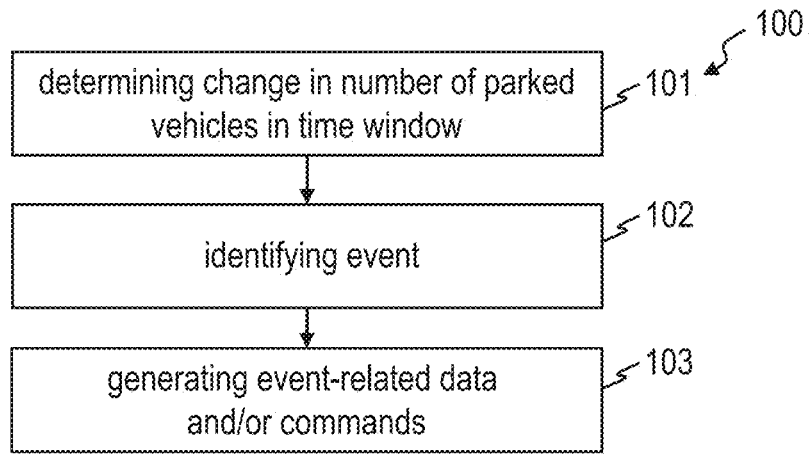
FIG. 4 is a flow chart of a method.

FIG. 4 is a flow chart of a method 100. The method 100 may be performed automatically by the processing system 20.

At step 101, a change in a number of vehicles parked in an area is determined. The change may represent the net change (sum of vehicles that are newly parked minus sum of vehicles that exit the area after having been parked there) in the number of parked vehicles. The change may represent the change determined for a time window. The time window may have a duration of, e.g., at least 1 min, at least 5 min, at least 10 min, or at least 15 min. The change may be determined as a function of time. The time window may be a sliding time window that shifts as time passes.

At step 102, the change in the number of parked vehicles is processed to determine whether an event (i.e., a social gathering that will cause an outflow of vehicles in a future time horizon that has an effect on traffic) takes place. Identifying whether the event takes place may comprise determining an expected time at which the outflow of vehicles will occur, which relates to the event duration.

At step 103, event-related data and/or commands are generated and output to trigger execution of one or several operations. The event-related data may provide input for another system or device, e.g., by triggering probes to issue traffic warnings and/or map server(s) to modify POI information and/or traffic management server(s) to start controlling traffic flow regulating devices prior to or at the time at which the expected outflow occurs.

The event identification at step 102 may be implemented in various ways, including a threshold comparison, correlations with previously observed changes for the same (or possibly also a similar) area, and/or more advances processing techniques, such as processing using an AI model.

Figure 5:
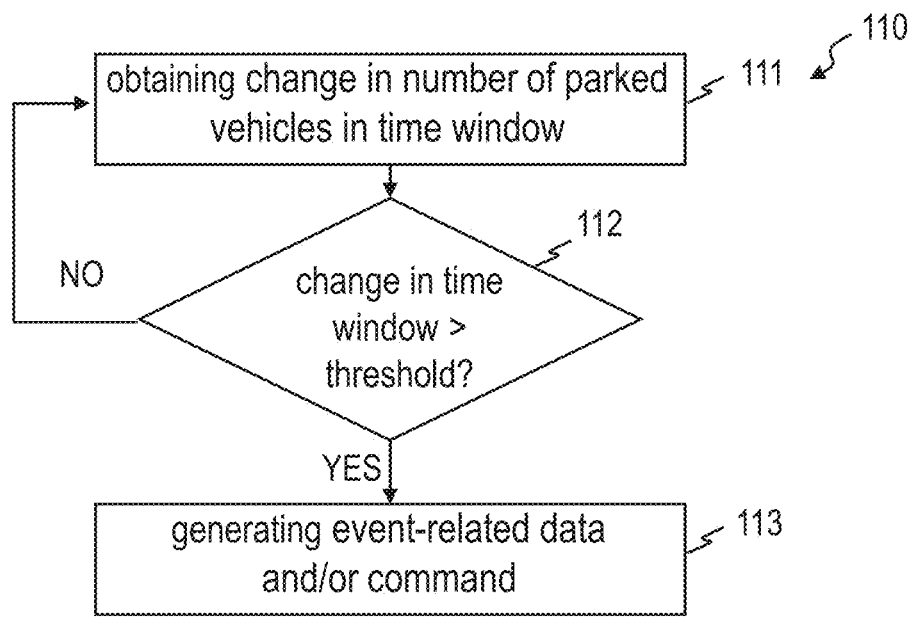
FIG. 5 is a flow chart of a method.

FIG. 5 is a flow chart of a method 110 that may be performed automatically by the processing system 20. The method 110 uses a threshold comparison to determine whether or not an event takes place.

At step 111, the change in the number of vehicles parked in an area is determined for a time window. This may be done by identifying probe traces that end in the area or probe traces that start in the area or by applying other filtering techniques that return the desired information.

At step 112, the change in the number of vehicles parked in the area for the time window is compared to a threshold. The threshold may be set so as to distinguish future outflow from the area that has a relevant effect on traffic from future outflow from the area that does not have a relevant effect. The threshold may be set in dependence on cell size and/or time window length. The threshold may be a monotonously increasing (e.g., strictly monotonously increasing) function of both cell size and time window length. The threshold may be set in dependence on road classes and/or speed limits. For illustration, for some areas it may be easier to accommodate the change in outflow from the area due to the presence of highways or other high-capacity roads. The threshold may be set automatically based on historically observed changes in the inflow and outflow from the area. This may be done in an area-specific manner. For illustration, the threshold may be set in dependence on previously observed changes in the number of parked vehicles that subsequently impacted the traffic flow by, e.g., causing traffic jams at the end of the event.

At step 113, event-related data and/or commands are generated and output to trigger execution of one or several operations. The event-related data may provide input for another system or device, e.g., by triggering probes to issue traffic warnings and/or map server(s) to modify POI information and/or traffic management server(s) to start controlling traffic flow regulating devices prior to or at the time at which the expected outflow occurs.

Figure 6:
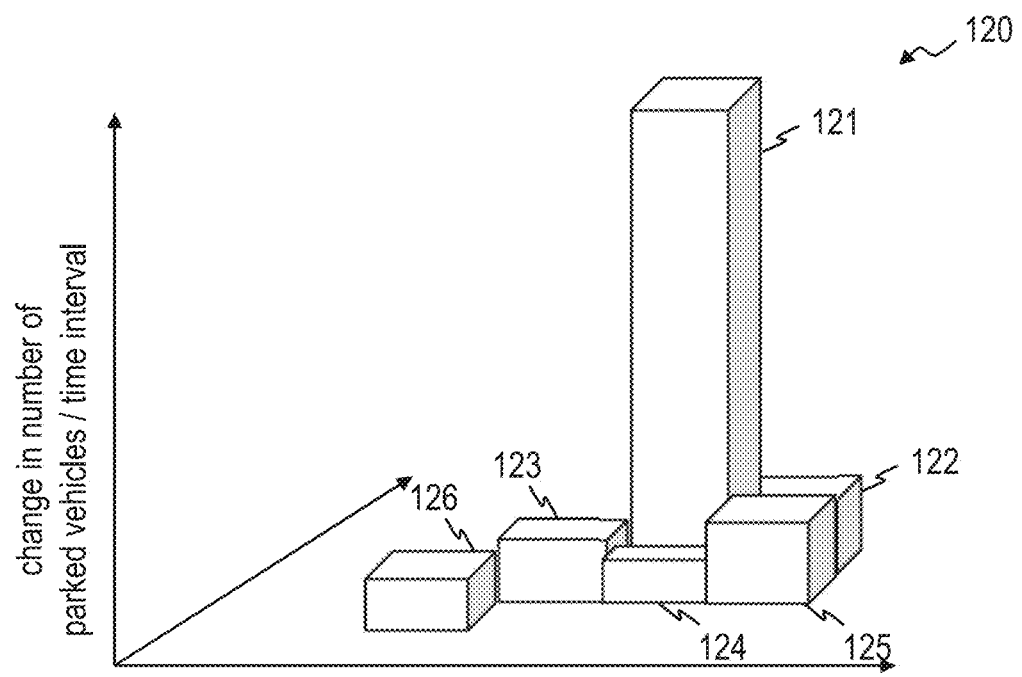
FIG. 6 shows a histogram representation of a change in a number of parked vehicles for explaining operation of the method and processing system.

FIG. 6 shows a histogram 120 representing a change in number of parked vehicles per time window, respectively as a function of cell location. While the values 121-126 for various cells can be regarded to represent the change of parked vehicles depicted as a function of coordinates on a map, no knowledge of a map is required for performing the event identification. Once it is known which vehicles terminate or start their trip in the respective cell with/after a parking operation, the event identification may be performed in a map agnostic manner, without requiring (and optionally without using) any map data for determining whether an event takes place and/or for estimating the event duration (such as by determining a prognostic future time at which an outflow of vehicles from the area is expected).

In FIG. 6, there is a significant number of vehicles 121 that are parked in the respective area. Based on a threshold comparison or other processing techniques (such as correlation functions or AI model processing), a relevant future traffic outflow from this area is predicted. This may be used for any one or any combination of operations, as explained herein. In other areas, the change 122-126 is less relevant and may not warrant any action to be taken by the probe data processing system. I.e., the probe data processing system may trigger an operation to be performed selectively if and when occurrence of a relevant event is identified.

While the identification of an event may be performed in a map-agnostic manner, it may be desirable to relate the cell which experiences a significant change in number of vehicles to a map for performing an operation. This may be done either by the probe data processing system 20 or by any device or system that receives the output 41 from the probe data processing system 20.

Figure 7:
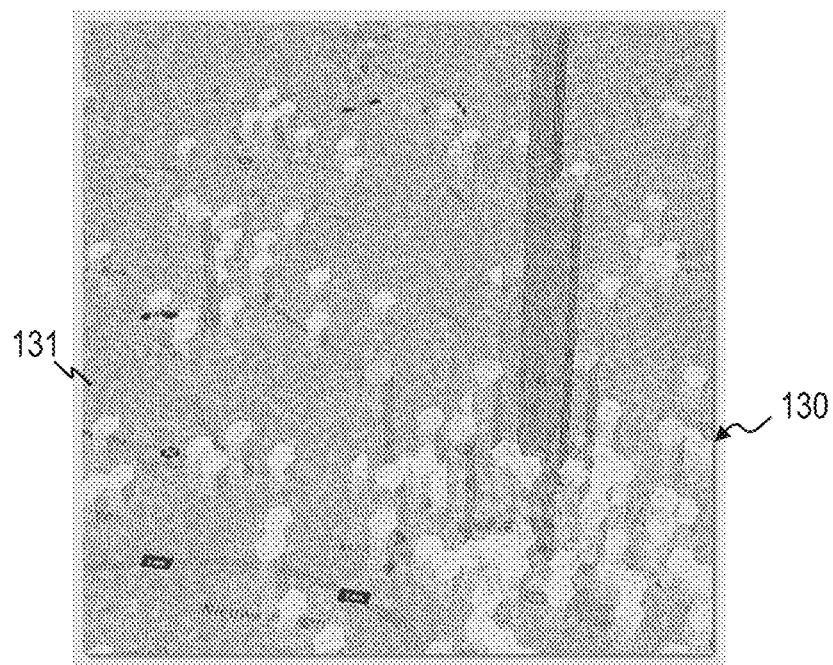
FIG. 7 shows a histogram representation of a change in a number of parked vehicles for explaining operation of the method and processing system.

FIG. 7 shows a graph 130 representing the determined changes in number of vehicles parked in a time window in each one of several areas (such as cells of a regular cell array), related to map data 131. Lookup or reverse geocoding may be performed to identify where on the map each cell is located. Predicted future traffic outflow may affect traffic in a predictive time horizon (such as less than 12 h or less than 10 h or less than 8 h or less than 6 h) in the future and this information may be utilized for any one or any combination of operations, such as navigation, map-related, or traffic flow management operations.

Figure 8:
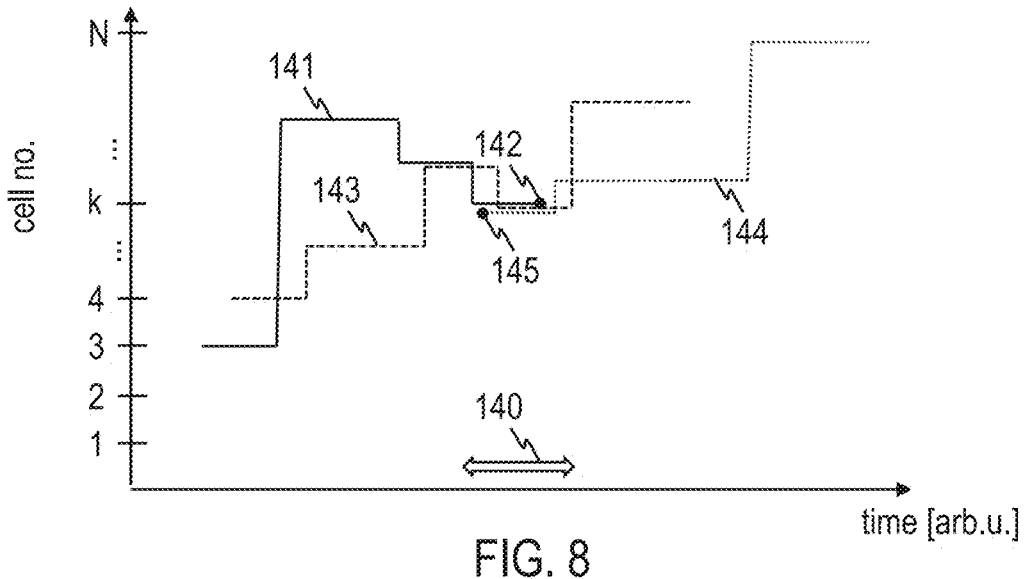
FIG. 8 is a graph showing various probe traces.

FIG. 8 is a graph showing how changes in numbers of parked vehicles can be determined. Shown in FIG. 8 are cell numbers in which a probe (such as a probe fixedly installed or removably arranged in or on a vehicle) is located as a function of time. The cells do not need to be consecutively numbered, so that there can be discontinuities in the functions 141-144.

The probe data includes first probe data 141 which ends in a certain area (cell number "k") at an end point 142. The first probe data 141 thus indicates that the vehicle in which the probe is arranged has been parked in the area within time window 140 (or has entered the area within the time window 140 and has subsequently been parked there, which would be also a useful criterion for determining the increase in the number of parked cars).

The probe data includes second probe data 144 which starts in a certain area (cell number "k") at a start point 145 The second probe data 144 thus indicates that the vehicle in which the probe is arranged has been parked in the area within time window 140 (or has left the area within the time window 140 after having previously been parked there, which would be also a useful criterion for determining the decrease in the number of parked cars).

The probe data includes third probe data 143 for a probe in a vehicle that passes through the area (cell number "k") but is not parked there. Such probes do not change the number of parked vehicles and can be filtered out for further processing.

Alternative or additional criteria may be used to determine whether a probe is located in a vehicle that is parked in the area or that starts moving after having been parked in the area. For illustration, if a probe continues to transmit position updates even when it is not moving, an average velocity may be computed (with the average being determined for a second time interval that may be different from the time window 140). Depending on a velocity threshold comparison, the probe may be identified as being located in a vehicle that parks or in a vehicle that has been parked before it starts moving again or in a vehicle that simply moves through the area. More advanced processing techniques may be used. For illustration, velocity profiles may be compared to (e.g., correlated with) previously determined velocity profiles to distinguish whether a car is parked or has been parked.

The change in the number of vehicles parked in an area may be determined as a time series. I.e., the time window 140 may be moving. The time series may correspond to regular or irregular sample times. Knowledge of the time-dependence of the change in the number of parked vehicles may be useful when discriminating different events and/or their related durations.

The determination of the change in the number of parked vehicles may be performed for each cell of a plurality of cells of a cell array.

Figure 9:
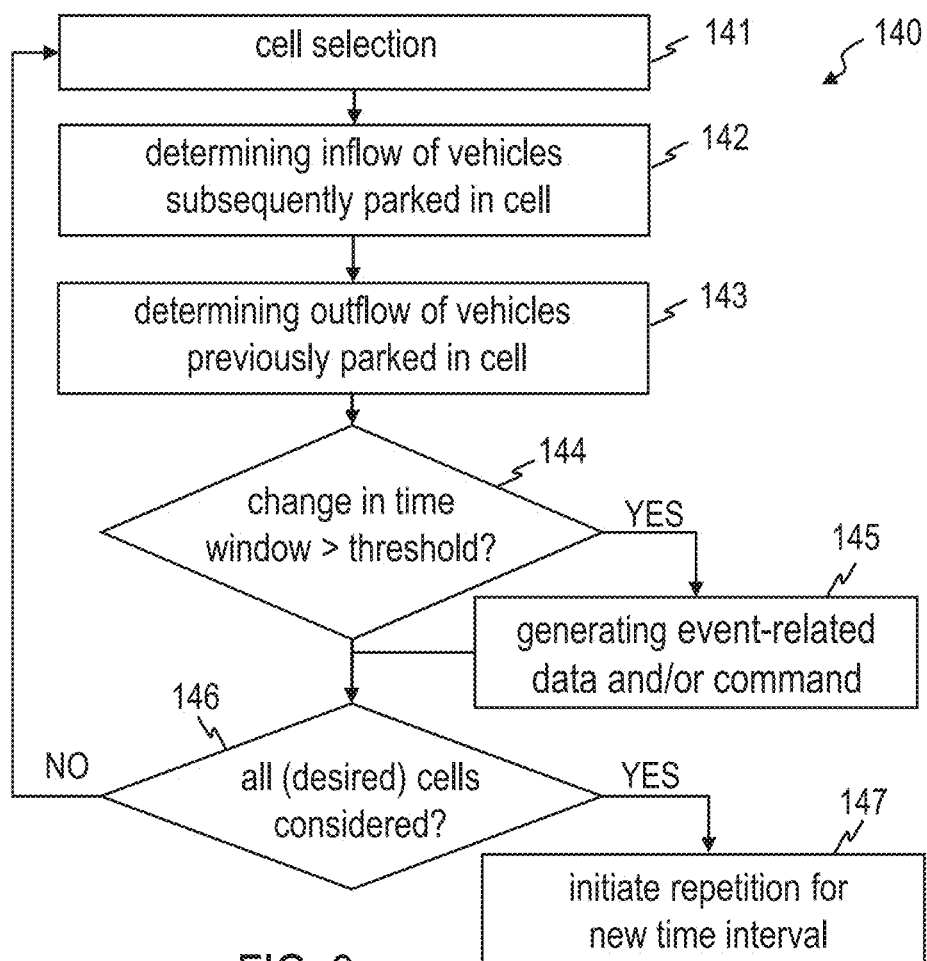
FIG. 9 is a flow chart of a method.

FIG. 9 is a flow chart of a method 140 that may be performed automatically by the processing system 20.

At step 141, a cell is selected. Cell selection may proceed using a random pattern or by incrementing a cell identifier.

At step 142, an inflow of vehicles into the cell may be determined, with the vehicles being subsequently parked in the cell within a time window. The identification may be performed by any one or any combination of: determining probe traces that end in the cell, using velocity threshold comparison, computing correlations with velocity profiles, or applying other classifiers.

At step 143, an outflow of vehicles from the cell may be determined, with the vehicles having been previously parked in the cell within the time window. The identification may be performed by any one or any combination of: determining probe traces that start in the cell, using velocity threshold comparison, computing correlations with velocity profiles, or applying other classifiers.

At step 144, it is determined whether a change in number of parked vehicles in the time window, which may be determined as the inflow of subsequently parked vehicles (step 142) minus the outflow of previously parked vehicles (step 143) indicates an event which is likely to affect the traffic over a predictive time horizon. This may be done using any one or any combination of: a threshold comparison to a change threshold, correlation with previously recorded changes in the number of parked vehicles in that area or similar areas, processing using an AI model, or processing using another classifier (such as a classifier that distinguished various event durations).

At step 145, if an event has been identifier, event-related data and/or commands may be generated. Execution of one or several operations may thereby be triggered. The one or several operations may comprise one, several, or all of navigation-related operations (such as route guidance or autonomous driving), electronic map-related operations (such as updating information of an electronic map in an intermittent manner), traffic flow management related operations (such as controlling electronically controllable traffic flow regulating devices). The method may then proceed to step 146.

At step 146, it is determined whether all desired cells (e.g., all cells of the cell array or all cells that overlap with land area having roads contained therein or all cells overlapping with an urban area) have been considered. If not all cells of interest have been considered, the method returns to step 141.

If all relevant cells have been considered, the method may be repeated at step 147 at a later time, e.g., for a shifted time window 140. The method may be repeated continually, e.g., periodically, to monitor for potential future traffic situations that may be caused by an event over a prognostic time horizon that may be between 1 hour and 12 hours, or between 2 hours and 10 hours, or between 2.5 hours and 8 hours, without being limited thereto.

For many operations, information that there is a potential future traffic issue, such as an expected future traffic outflow from an area, is already helpful. For illustration, traffic warnings, addition of new POIs, POI ranking, and/or other POI-related map updates may be implemented based on the knowledge that an event signaled by an increase in the number of parked vehicles is identified.

The techniques disclosed herein may be implemented such that they are capable of also estimating the duration of the event and/or the traffic pattern of expected outflow from the area in a time in the future. The time in the future may be at least 1 hour or at least 2 hours in the future. The time in the future may be a new-future time, which may be less than 12 hours or less than 8 hours in the future.

Figure 10:
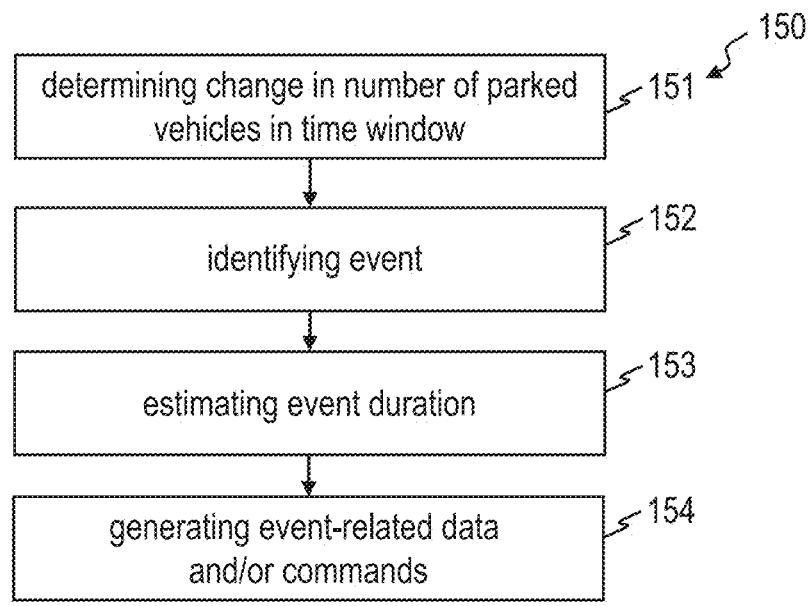
FIG. 10 is a flow chart of a method.

FIG. 10 is a flow chart of a method 150, which may be performed automatically by the probe data signal processing system 20. The method 150 may be operative to not only identify an event causing an expected outflow of traffic, but to also estimate when this expected outflow of traffic is likely to occur.

At step 151, the change in the number of parked vehicles in an area that occurs within a time window 140 is determined. At step 152, an event may be identified based on the change in the number of parked vehicles. These steps may be implemented using any one of the techniques disclosed herein and described hereinabove.

At step 153, a duration of the event is estimated. As used herein, the term "duration of an event" refers to a time that indicates the time delay between the increased inflow of traffic into an area for parking and the subsequent increased outflow of traffic from that area. The observed increase in the number of parked vehicles in a time window, respectively determined as a function of time (i.e., with a sliding time window), may be compared to previously observed changes in the number of parked vehicles in the same or a similar area, to thereby predict when an increased traffic outflow can be expected and/or to predict a time-dependence of the traffic outflow. This may be done in various ways. Correlation functions may be computed to correlate the currently observed time-dependent change in the number of parked vehicles to several previously observed time-dependent changes stored in historical data. The expected duration and/or outflow traffic pattern may be estimated based at least on the previously observed time-dependent change in parked vehicle number which most closely resembles (as quantified by the correlation function) the currently observed time-dependent change in the number of parked vehicles. Alternatively or additionally, weighted summation may be performed to estimate the event duration from previously recorded traffic inflow and outflow patterns, with the weights being dependent on the degree if similarity (as quantified by the correlation function) of the currently observed time-dependent change in the number of parked vehicles to the previously observed time-dependent changes in parked vehicle number. Alternatively or additionally, an AI model trained with previously observed time-dependent changes in parked vehicle numbers, as recorded in historic data, may be used to process time-series data (AI model input layer) and provide, as AI model output, information on the event duration (AI model output layer). The trained AI model may be applied to the currently observed time-dependent change in parked vehicle number. Alternatively or additionally, averaging of previously observed event durations may be performed to obtain an estimate for the event duration in a simple manner.

At step 154, event-related data and/or commands may be generated. Execution of one or several operations may thereby be triggered. The one or several operations may comprise one, several, or all of navigation-related operations (such as route guidance or autonomous driving), electronic map-related operations (such as updating information of an electronic map in an intermittent manner), traffic flow management related operations (such as controlling electronically controllable traffic flow regulating devices).

Figure 11:
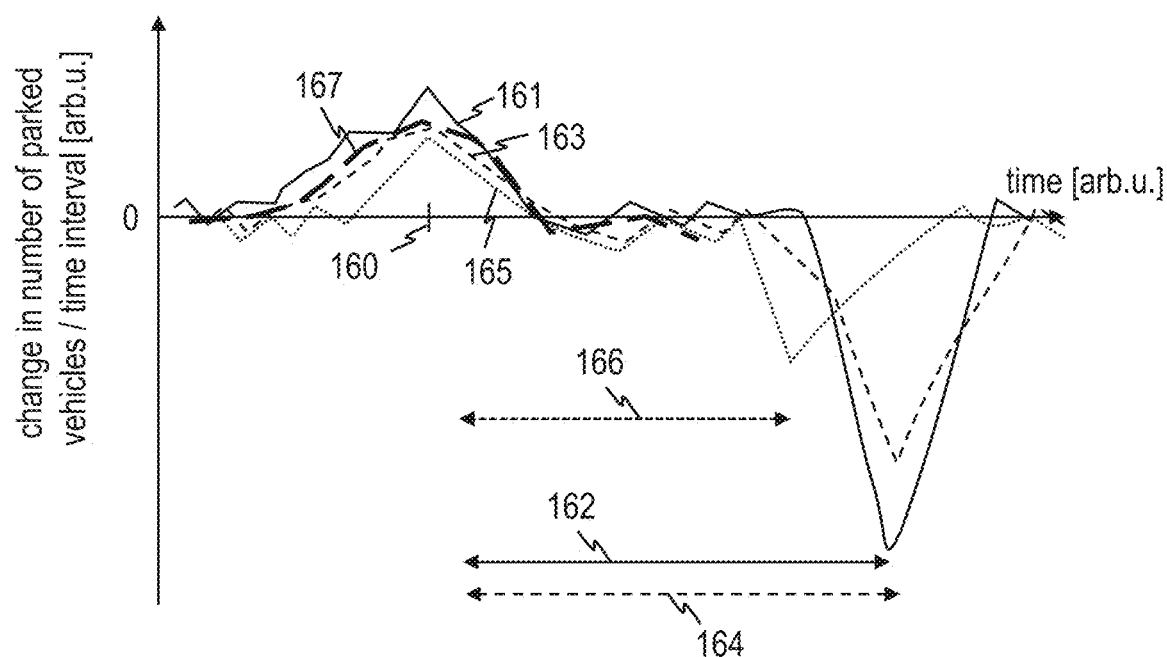
FIG. 11 is a graph showing changes in a number of parked vehicles as a function of time for illustrating event duration prediction.

FIG. 11 illustrates the process of estimating event duration for a currently observed increase 167 in the number of parked vehicles. The increase 167 may be compared to the traffic inflow part of previously recorded changes 161, 163, 165 in the number of parked vehicles recorded over the time window, respectively as a function of time. The previously recorded changes 161, 163, 165 and the increase 167 may be aligned at their peak for ease of comparison, as indicated by peak position 160. The previously recorded changes 161, 163, 165 include traffic outflow that follow the peak position 160 with a delay 162, 164, 166 that varies from one curve to another. The delays 162, 164, 166 may indicate the time gap between the peak in inflow of vehicles that are then parked in the area (onset of the event) and a peak in the outflow of vehicles that have previously been parked in the area (end of the event).

The event duration may be estimated by averaging the delays 162, 164, 166.

The event duration may be estimated to be equal to the event duration 164 of the previously recorded change 163 that most closely resembles (as quantified by a correlation function) the currently observed increase.

The event duration may be estimated as a weighted average of the delays 162, 164, 166. The weights used for weighted averaging may be dependent on the correlations between the increase 167 and the previously recorded changes 161, 163, 165, with the weights being an increasing function of the correlation (e.g., being proportional to the correlation).

The event duration may alternatively or additionally be determined using other techniques, e.g., by using a trained AI model or a classifier technique.

Figure 12:
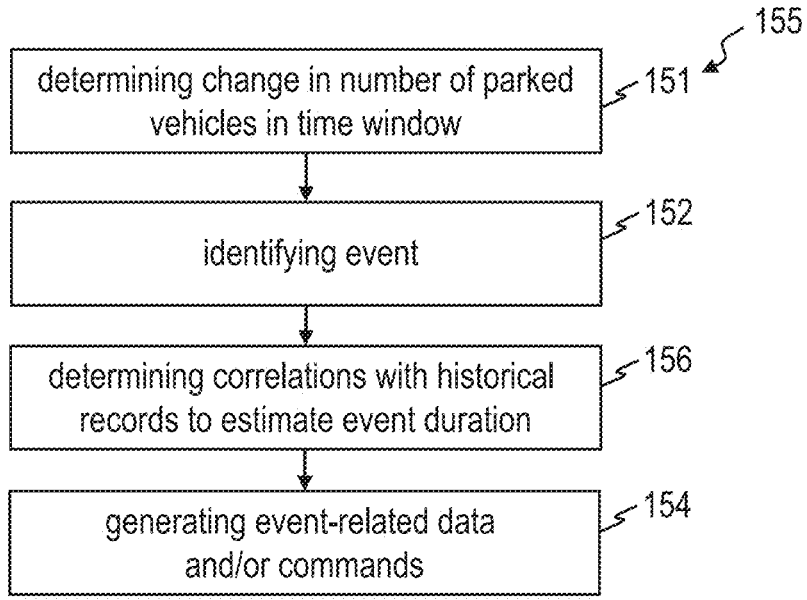
FIG. 12 is a flow chart of a method.
Figure 13:
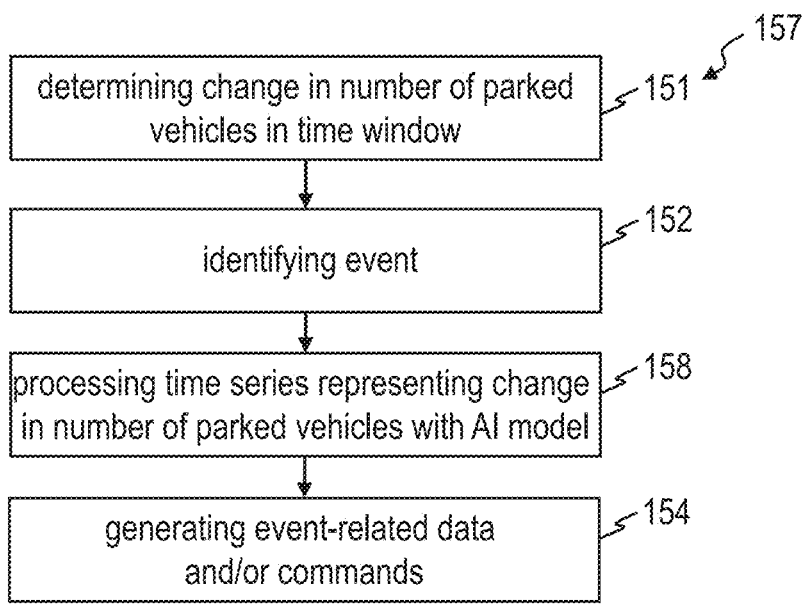
FIG. 13 is a flow chart of a method.

FIGS. 12 and 13 are flow charts of methods 155 and 157 that may be performed automatically by the probe data processing system 20. Steps 151, 152, and 154 may be performed as explained with reference to FIG. 10.

Method 155 of FIG. 12 comprises a step of determining correlations of a currently observed change in the number of parked vehicles with several recorded historical time-dependent changes in the number of parked vehicles. The expected duration and/or outflow traffic pattern may be estimated based at least on the previously observed time-dependent change in parked vehicle number which most closely resembles (as quantified by the correlation function) the currently observed time-dependent change in the number of parked vehicles. Alternatively or additionally, weighted summation may be performed to estimate the event duration from previously recorded traffic inflow and outflow patterns, with the weights being dependent on the degree if similarity (as quantified by the correlation function) of the currently observed time-dependent change in the number of parked vehicles to the previously observed time-dependent changes in parked vehicle number.

Method 157 of FIG. 13 comprises a step 158 of processing a time series representing a change in the number of parked vehicles using an AI model. The AI model is trained with previously observed time-dependent changes in parked vehicle numbers, as recorded in historic data, may be used to process time-series data (AI model input layer) and provide, as AI model output, information on the event duration (AI model output layer). The trained AI model may be applied to the currently observed time-dependent change in parked vehicle number to obtain the estimated event duration.

Figure 14:
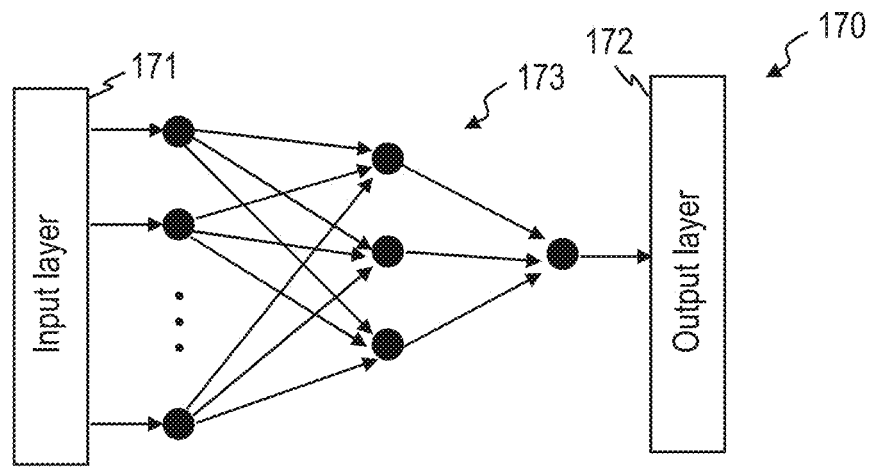
FIG. 14 shows an artificial intelligence model.

FIG. 14 is a schematic representation of an AI model 170 that may be used to estimate the event duration. The AI model 170 has an input layer 171 operative to receive at least a portion of time-series data that represent changes in the number of parked vehicles as a function of time. The AI model 170 has an output layer 172 that outputs an event duration expected for the time-series input data. The AI model has several hidden layers 173. The AI model 170 may be an artificial neural network (ANN), such as a convolutional neural network (CNN) or recurrent neural network (RNN). The AI model 170 may comprise a structure more specifically tailored for processing time-series data, such as gated recurrent units (GRUs) and/or long-short term memory (LSTM) cells. The AI model 170 may be trained using a set of previously observed time-dependent changes in the number of vehicles parked in the area per time period. The training is performed with the objective of obtaining, as AI model output, the event duration as previously observed for the respective historical change in the number of parked vehicles. Techniques such as gradient descent may be used for implementing the training. The AI model may be validated on a test set prior to field use.

A separate AI model may be trained for each cell. I.e., when AI models are used, different cells of the cellular array may have different AI models assigned thereto for predicting event duration.

While the AI model may be operative to predict event duration, an AI model having a structure similar to the one explained with reference to FIG. 14 may also be used and applied to time-series input data to determine whether the time-series input data indicates a change in the number of parked vehicles that is associated with an event that gives rise to a subsequent relevant increase in traffic outflow.

In either case, the AI model 170 may be retrained while the AI model 170 is operative in field use. The AI model 170 may thereby be continually improved during its field use as new data become available.

Figure 15:
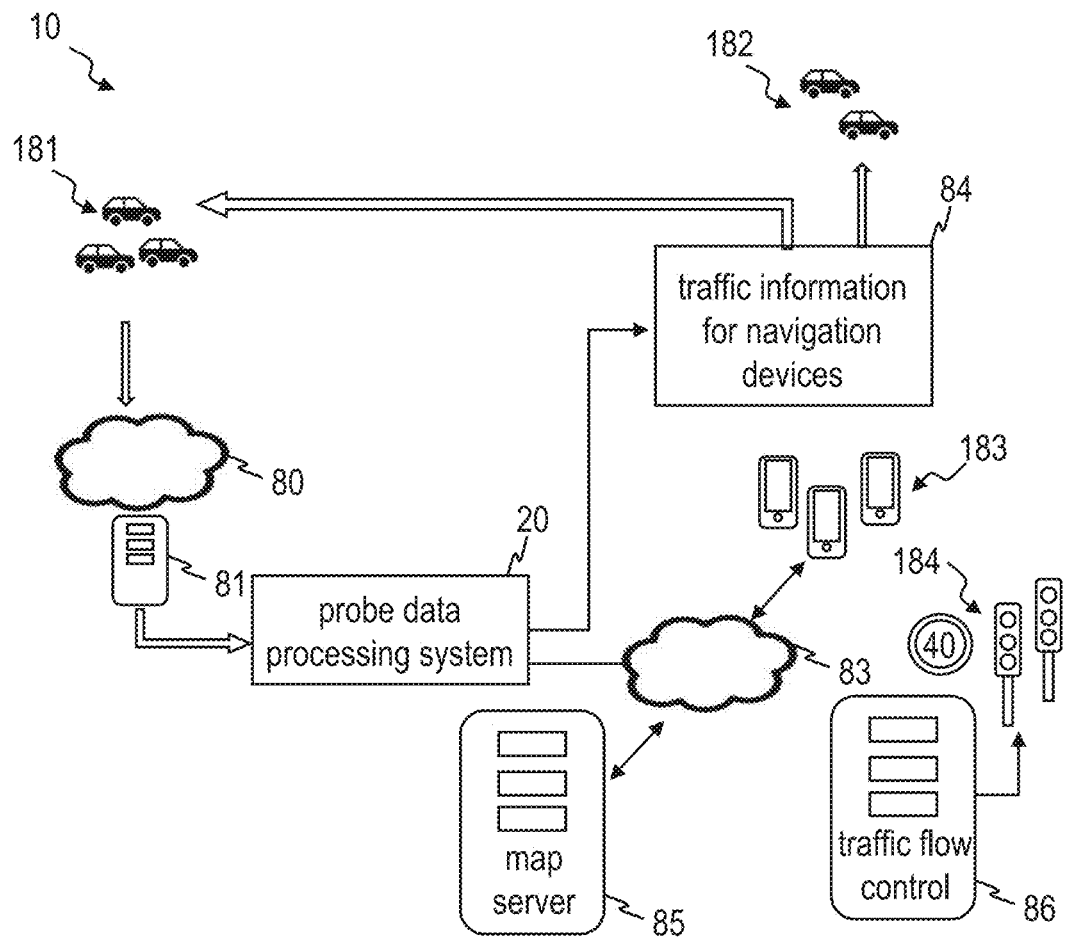
FIG. 15 is a diagram of a system that comprises the probe data processing system.

FIG. 15 is a diagram of a system 10 that comprises the processing system 20. The system 10 comprises probes located in vehicles 181 that agreed to share probe trace data for event detection. The system 10 may comprise probes located in other vehicles 182 that have not agreed to share the probe trace data.

Results of the processing of probe data may be provided to a traffic information system 84 for navigation devices or other probes. The traffic information system 84 may provide information on the expected future outflow from a cell to probes, including probes in vehicles 182 that have not agreed to share probe trace data. The traffic information system 84 may provide information on the expected future outflow from a cell to probes, located in vehicles 181 that agreed to share probe trace data for event detection.

Results of the processing of probe data may be provided to terminal devices 183 via a wireless communication system. The terminal devices 183, even when not necessarily installed in vehicles, may still be interested in the results of the event detection. For illustration, a map server 85 coupled to the prober data processing system 20 via a wide area network (WAN) 83 or another communication channel may update POI information in an electronic map. This information may be provided to probes in vehicles 181, 182 and/or other terminal devices 183.

Results of the processing of probe data may be provided to a traffic flow management server 86. The traffic flow management server 86 may issue control signals, responsive to the output of the probe data processing system 20, to control one or several traffic flow regulating devices 184 in a manner that depends on the identified event. The traffic flow regulating devices 184 may be selected from a group comprising or consisting of traffic lights, adjustable speed limits, and/or lane designations. The traffic flow management server 86 may issue control signals to one or several of of traffic lights, adjustable speed limits, and/or lane designations. The traffic flow management server 86 may start controlling the traffic flow regulating devices 184 prior to the onset of the outflow from the area and/or before effects of the outflow from the area on the traffic are observable.

The system 10 may further comprise an autonomous vehicle communicatively coupled, either directly or indirectly, to the probe data processing system 20 and operative to perform at least one autonomous driving operation responsive to the identified event. The vehicle (not shown in FIG. 15) may be configured as described in more detail with reference to FIG. 20.

The system 10 may comprise one, several, or all of the traffic information system 84, the map server 85, the traffic flow management server 86 and traffic flow regulating components 184 connected thereto, the autonomous vehicle.

Figure 16:
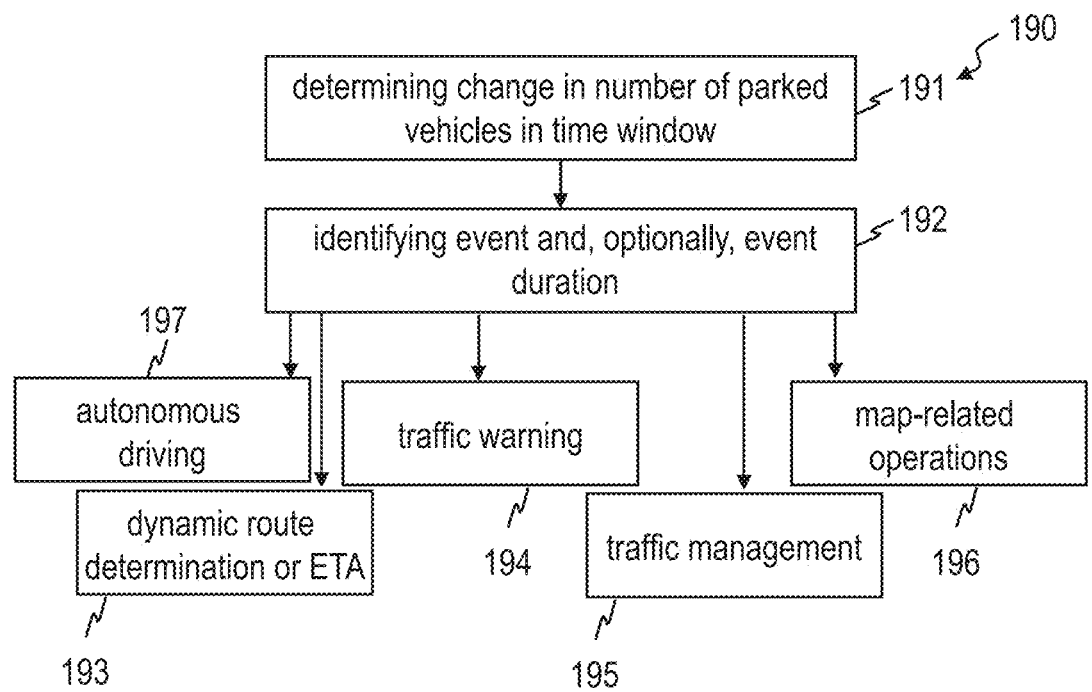
FIG. 16 is a flow chart of a method.

FIG. 16 is a flow chart of a method 190 that may be performed automatically by the system 10.

At steps 191, 192, the change in the number of parked vehicles in an area is determined and occurrence of an event, and optionally event duration, are identified. Steps 191, 192 may be performed automatically by the probe data processing system 20. The probe data processing system 20 may trigger execution of one or several operations responsive to the detected event, and optionally event duration.

The method may comprise execution of the operations, which may comprise one, several, or all of:
- a step 193 of performing, by a probe such as a navigation device (e.g., a navigation device that may be an in-dashboard device or that may be removably arranged in or on a vehicle, such as a smartphone or other mobile terminal of a cellular communication network that executed a navigation-related task) and/or a traffic information server, ETA and/or route guidance responsive to the identified event and, optionally event duration;
- a step 194 of outputting by a traffic information server, a probe, or another terminal device a traffic warning responsive to the identified event and, optionally event duration;
- a step 195 of performing, by a traffic flow management system, a traffic flow control operation (e.g., by controlling electronically controllable traffic flow regulation devices such as traffic lights);
- a step 196 of performing, by a map server, a map-related operation (e.g., by updating POI information or ranking POIs);
- a step 197 of performing, by an autonomous vehicle, an autonomous driving operation (e.g., by controlling a vehicle steering direction and/or speed based at least on the identified event).

Figure 17:
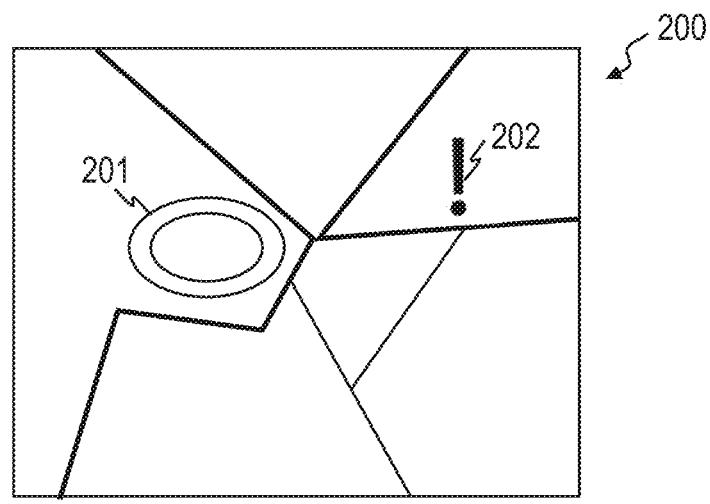
FIG. 17 is a schematic representation of map data.

FIG. 17 is a schematic representation of an electronic map 200 that illustrates how the results of the probe data processing may be used for electronic map-related functions. If an increase in parked vehicles is observed for an area that contains or is located in proximity to a POI 201, information on the POI 201 may be updated. For illustration, a relevance of the POI 201 may be increased for POI ranking. If an increase in parked vehicles is observed for an area that does not contain and/or is not located in proximity to an existing POI, a new POI 202 may be added. This may be done by adding a generic POI. Additional information on the new POI may be retrieved and incorporated into the POI information by performing, e.g., a web-crawling operation to retrieve information on the event.

Information on a detected change in the number of parked vehicles may be used not only for event identification, but also for improving subsequent event identifications that occur one or several days (e.g., at least one day or at least two days) after the observed event. For illustration, changes detected during field use may be stored for subsequent use in event duration estimation (as illustrated for curves 161, 163, and 165 in FIG. 11).

Figure 18:
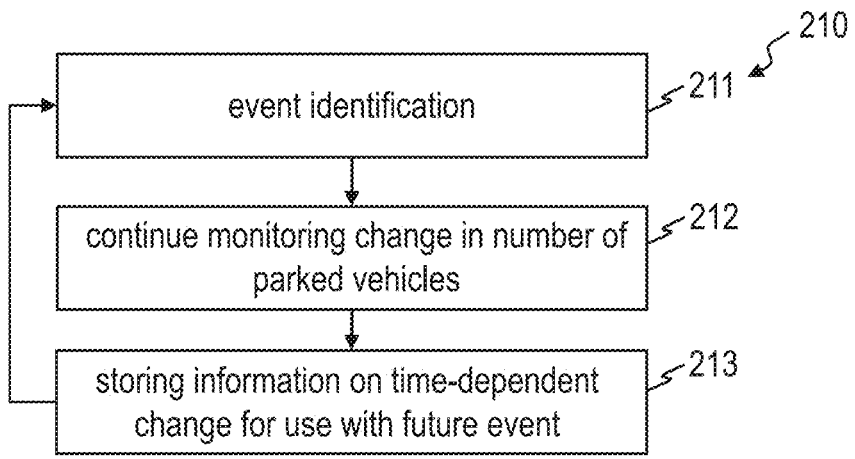
FIG. 18 is a flow chart of a method.

FIG. 18 is a flow chart of a method 210 that may be performed automatically by the probe data processing system 20 and which includes storing detected changes for subsequent use.

At step 211, an event is identified. This may be done using any one of the techniques disclosed herein.

At step 212, even when an event is identified based on an increase in the number of parked vehicles, monitoring of the change in the number of parked vehicles may be continued. I.e., not only the increase in the number of parked vehicles (onset of event) but also the subsequent decrease (end of the event) may be monitored and recorded.

At step 213, the information on the time-dependent increase and subsequent decrease in the number of parked vehicles may be stored for later use. Later use may comprise calculation of correlation functions (as explained with reference to FIGS. 11 and 12) and/or AI model training (as explained with reference to FIGS. 13 and 14).

Steps 211-213 may be repeated in an ongoing basis.

Figure 19:
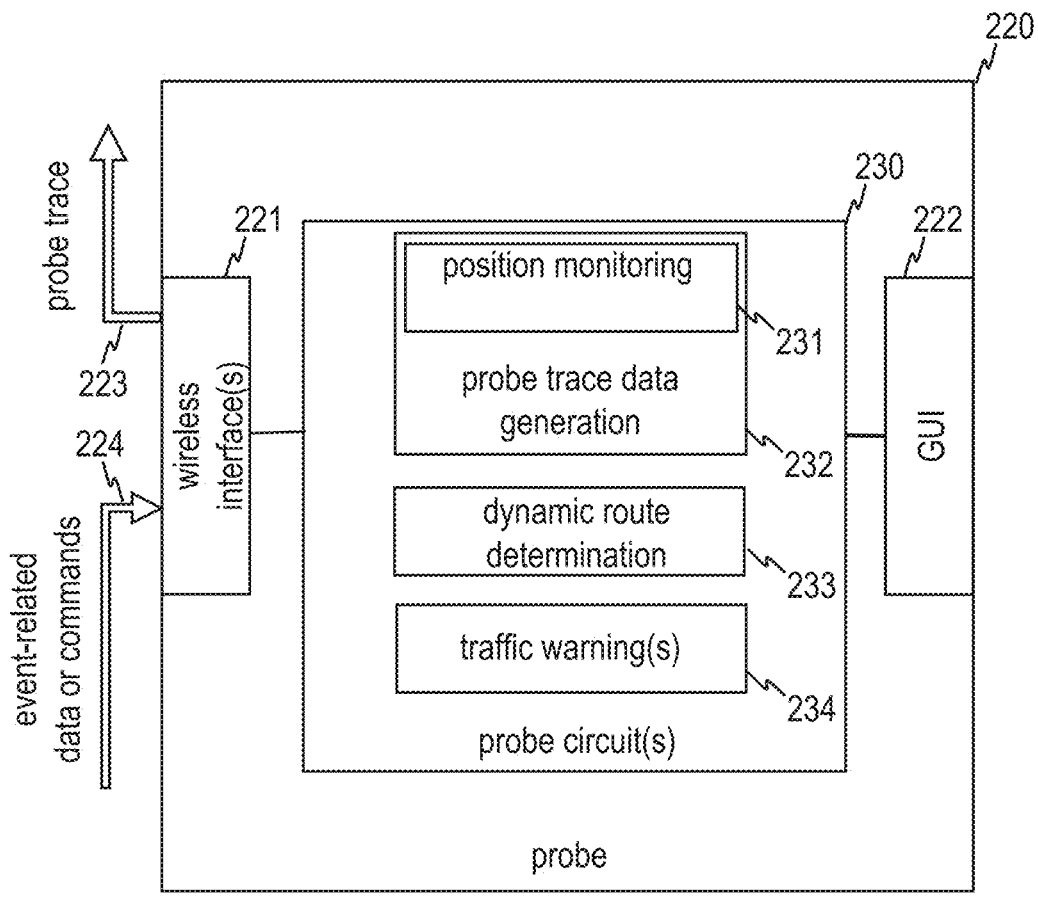
FIG. 19 is a block diagram of a probe.

FIG. 19 is a block diagram of a probe 220 that may be comprised by the system 10. The probe 220 may be an in-dashboard navigation device. The probe 220 may be a navigation device that is temporarily arrangeable in or on a vehicle (e.g., by being releasably mounted thereto or otherwise arranged in or on the vehicle). The probe 220 may be a smartphone or other mobile terminal of a cellular communication network.

The probe 220 comprises one or several wireless interface(s) 221 operative to output probe trace data 223 for use by the probe data processing system 20 and/or receive event-related data or commands 224 that depend on the output of the probe data processing system 20.

The probe 220 comprises one or several probe circuit(s) 230. The probe circuit(s) may comprise any one or any combination of integrated circuits, integrated semiconductor circuits, processors, controllers, application specific integrated circuits (ASICs), field programmable gate arrays (FPGAs), circuit(s) including quantum bits (qubits) and/or quantum gates, without being limited thereto.

The probe circuit(s) 230 may be operative to generate and output the probe trace. For illustration, the probe circuit(s) 230 may comprise a position monitoring module 231, which may be a GNSS chip or chipset. A probe trace data generation module 232 may generate the probe trace for outputting, e.g., by transmitting position updates.

The probe circuit(s) 230 may be operative to take action(s) responsive to the event-related data or commands 224. The probe circuit(s) 230 may be operative to perform a dynamic route determination 233 in dependence on the expected outflow of traffic indicated by the event-related data or commands 224. Alternatively or additionally, the probe circuit(s) 230 may be operative to perform an ETA determination in dependence on the expected outflow of traffic indicated by the event-related data or commands 224 and to output the ETA via a user interface that may comprise a graphical user interface (GUI) 222. Alternatively or additionally, the probe circuit(s) 230 may be operative to output traffic warnings 234 via a user interface that may comprise a graphical user interface (GUI) 222.

Figure 20:
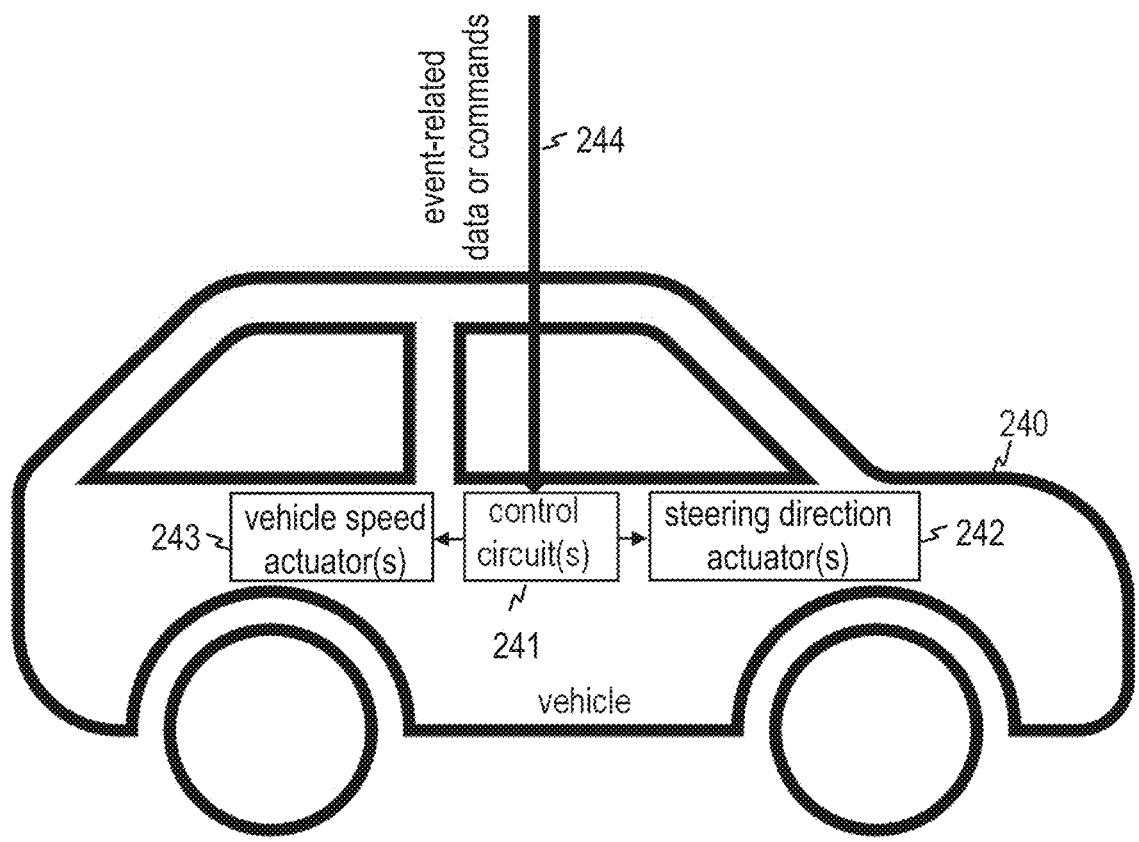
FIG. 20 is a block diagram of a vehicle.

FIG. 20 is a diagram of a vehicle 240 that may be comprised by the system 10. The vehicle 240 may be operative to perform autonomous driving operations.

The vehicle 240 comprises one or several control circuit(s) 241 operative to control actuator(s) of the vehicle 240 in an autonomous manner. The control circuit(s) 241 are operative to control at least some of the actuator(s) responsive to the identified event, optionally including the event duration. The control circuit(s) 241 may be operative to control at least an actuator 242 operative that affects a driving direction and an actuator 243 that affects a vehicle speed responsive to the identified event. For illustration, steering wheel angle and/or vehicle speed (e.g., engine output) may be controlled in a time-dependent manner by the control circuit(s) 241 so as to cause the vehicle to bypass the area or surrounding of the area in which the event has been identified to take place, in a time around the (predicted) end of the event. Information 244 on the identified event may be received via a wireless interface of the vehicle 240, e.g., via a cellular communication interface and/or a vehicle-to-vehicle (V2V) interface.

While embodiments have been described with reference to the drawings, modifications and alterations may be implemented in other embodiments.

For illustration, while embodiments have been described which can detect events without requiring retrieval of information on the event(s) from the internet, the techniques disclosed herein lend themselves for being combined with web crawling operations for additional information.

For further illustration, while embodiments have been described in which GPS or other location traces are processed, the probe data may have various forms that indicate in which area and at what time a vehicle is parked and/or when the vehicle starts moving again after having been parked.

For further illustration, while embodiments have been described in which a change in a number of vehicles is detected for a cell of a cell array, the techniques are not limited to this type of area.

Various effects and advantages are attained by embodiments of the invention. For illustration, embodiments provide methods, systems, and devices that allow events that give rise to future traffic increases to be identified. The methods, systems, and device allow events that give rise to future traffic increases to be identified without relying exclusively on information provided by publicly available event calendars that may be accessible via web crawling techniques. The methods, systems, and devices allow events to be identified and, optionally, event durations to be predicted for non-periodic or sporadically occurring events.

The invention claimed is:

1. A method for processing probe data, comprising:
processing the probe data to determine a change in a number of vehicles parked in an area, the probe data including information for probe traces for a plurality of probes;
identifying an occurrence of an event based at least on the change in the number of vehicles parked in the area;
performing one or more operations responsive to the occurrence of the event, the one or more operations being selected from among: traffic flow controlling; dynamic vehicle route guiding; operations for autonomous driving; digital map information updating; traffic warning outputting; point of interest (POI) identifying; and POI ranking;

identifying POIs based at least on map data, the identifying POIs includes determining whether at least one of the POIs is located in proximity to the area; and when the occurrence of the event is identified and none of the POIs is in proximity to the area, updating the map data to include information about a new POI located within or in spatial proximity to the area.

2. The method of claim 1, wherein processing the probe data and identifying the occurrence of the event are performed in a map-agnostic manner.

3. The method of claim 1, further comprising:
determining, responsive to the occurrence of the event, a predicted future traffic increase; and
selecting the one or more operations based on the predicted future traffic increase.

4. The method of claim 1, wherein the area includes at least one cell in a cell array.

5. The method of claim 4, wherein determining the change in the number of vehicles parked in the area includes:
determining, for each of one or more cells in the cell array, at least one of:
a number of probe traces terminating in that cell; and
a number of probe traces starting in that cell.

6. The method of claim 5, wherein determining the number of probe traces terminating in a given cell includes identifying probe traces for which at least one of:
a last trace location prior to a termination is located within the given cell; and
a time-dependence of a location as indicated by the probe trace fulfills a first criterion, the first criterion including at least one of:
a correlation with probe traces known to have terminated; and
a threshold of location change per time indicated by the probe trace.

7. The method of claim 5, wherein determining a number of probe traces starting in a given cell includes identifying probe traces for which at least one of:
an initial trace location of the probe trace is located within the given cell; and
a time-dependence of a location as indicated by the probe trace fulfills a second criterion, the second criterion including at least one of:
a correlation with probe traces known to have started; and
a threshold of location change per time indicated by the probe trace.

8. The method of claim 1, wherein determining the change in the number of vehicles parked in the area includes:
identifying, based at least on the probe data, at least one of vehicle trips terminating or starting within the area.

9. The method of claim 1, wherein at least one of identifying the occurrence of the event and performing the one or more operations includes at least one of:
a threshold comparison of the change in the number of vehicles parked in the area;
a correlation of the change in the number of vehicles parked in the area as a function of time with previously recorded time-dependent changes that are known to be caused by events;
a proximity of the area to a known POI; and
a combination of the change in the number of vehicles with information different from the probe data, the information different from the probe data including at least one of:
information on at least one POI located in proximity to the area; and
information on scheduled events.

10. The method of claim 1, wherein identifying the occurrence of the event includes:
processing, using an artificial intelligence (AI) model, time-series data indicative of at least one of:
the change in the number of vehicles parked in the area;
an inflow of vehicles; and
an outflow of vehicles;
wherein the AI model includes an input layer operative to receive samples of the time series data and an output layer operative to provide an AI model output indicative of at least one of:
an occurrence of an event; and
a duration of the event.

11. The method of claim 1, wherein the information about the new POI is deleted from the map data upon an end of the event.

12. The method of claim 1, further comprising:
determining an expected duration of the event, the determining including one or more of:
correlating the change in the number of vehicles parked in the area with previously observed changes in the number of parked vehicles in the area or other areas and corresponding previously observed event durations;
retrieving information on the expected duration from a first event information source; and
retrieving information on an event type of the event from a second event information source and determining the expected duration based on the event type; and
selecting the one or more operations to be performed based at least in part on the expected duration of the event.

13. The method of claim 1, further comprising:
determining an expected duration of the event by using an artificial intelligence (AI) model to process time-series data indicative of one or more of:
the change in the number of vehicles parked in the area;
an inflow of vehicles; and
an outflow of vehicles;
wherein the AI model includes an input layer operative to receive samples of the time series data and an output layer operative to provide an expected duration of the event; and
selecting the one or more operations to be performed based at least in part on the expected duration of the event.

14. The method of claim 1, wherein the event includes at least one of:
an event creating a specified outflow of vehicles from the area; and
a gathering of a number of people exceeding a size threshold.

15. The method of claim 1, further comprising:
receiving the probe data from a specified source; and
providing information about the occurrence of the event to at least one of:
probes located in the area;
probes located outside the area;
a traffic management system; and
a map server system.

16. A system for processing probe data, the system comprising:

a processing system that includes:

an interface operative to receive probe data, the probe data including information on probe traces for a plurality of probes; and at least one circuit operative to:

process the probe data to determine a change in a number of vehicles parked in an area;

identify an occurrence of an event based at least on the change in the number of vehicles parked in the area;

perform one or more operations responsive to the occurrence of the event, the one or more operations being selected from among: traffic flow controlling; dynamic vehicle route guiding; operations for autonomous driving; digital map information updating; traffic warning presenting; point of interest (POI) identifying; and POI ranking, identify POIs based at least on map data, wherein the at least one circuit being operative to identify POIs includes being operative to determine whether at least one of the POIs is located in proximity to the area; and when the occurrence of the event is identified and none of the POIs is in proximity to the area, update the map data to include information about a new POI located within or in spatial proximity to the area.

17. The system of claim 16, comprising:

a probe including:

at least one probe interface operative to:

transmit information about a probe trace, the probe trace having a time-dependence on a location of the probe; and receive information about the occurrence of the event from the processing system; and at least one probe circuit operative to use the information about the occurrence of the event for at least one of: dynamic vehicle route guiding; operations for autonomous driving; traffic warning outputting; and estimated time of arrival (ETA) determining.

18. The system of claim 17, wherein the system comprises at least one of:

a traffic flow management system interfaced with the processing system and operative for performing traffic flow control responsive to the occurrence of the event;

a map server interfaced with the processing system and operative to update map information responsive to the occurrence of the event; and a vehicle interfaced with the processing system and operative to perform at least one autonomous driving operation responsive to the occurrence of the event.

19. A system for processing probe data, the system comprising:

a processing system that includes:

an interface operative to receive probe data, the probe data including information on probe traces for a plurality of probes; and at least one circuit operative to:

process the probe data to determine a change in a number of vehicles parked in an area;

identify an occurrence of an event based at least on the change in the number of vehicles parked in the area;

perform one or more operations responsive to the occurrence of the event, the one or more operations being selected from among; traffic flow controlling; dynamic vehicle route guiding; operations for autonomous driving; digital map information updating; traffic warning presenting; point of interest (POI) identifying; and POI ranking;

identify POIs based at least on map data, wherein the at least one circuit being operative to identify POIs includes being operative to determine whether at least one of the POIs is located in proximity to the area; and when the occurrence of the event is identified and none of the POIs is in proximity to the area, update the map data to include information about a new POI located within or in spatial proximity to the area a probe including:

at least one probe interface operative to:

receive information about the occurrence of the event from the processing system; and at least one probe circuit operative to use the information about the occurrence of the event for at least one of: dynamic vehicle route guiding; operations for autonomous driving; traffic warning outputting; and estimated time of arrival (ETA) determining.

\* \* \* \* \*